US008311338B2

(12) United States Patent  
Stein et al.

(10) Patent No.: US 8,311,338 B2
(45) Date of Patent: Nov. 13, 2012

(54) METHOD AND SYSTEM FOR LEARNING A SAME-MATERIAL CONSTRAINT IN AN IMAGE

(75) Inventors: Andrew Neil Stein, Pittsburgh, PA (US); Bartholomeus Christianus Leonardus Nabbe, Hillsboro, OR (US); Casey Arthur Smith, Grand Junction, CO (US); James Andrew Bagnell, Pittsburgh, PA (US); David Allen Tolliver, Pittsburgh, PA (US)

(73) Assignee: Tandent Vision Science, Inc., San Francisco, CA (US)

( * ) Notice: Subject to any disclaimer, the term of this patent is extended or adjusted under 35 U.S.C. 154(b) by 409 days.

(21) Appl. No.: 12/584,910

(22) Filed: Sep. 15, 2009

(65) Prior Publication Data

US 2011/0064308 A1 Mar. 17, 2011

(51) Int. Cl.
- G06K 9/34 (2006.01)
- G06K 9/46 (2006.01)
- G06K 9/66 (2006.01)
- G06K 9/48 (2006.01)

(52) U.S. Cl. .................... 382/191; 382/174; 382/199
(58) Field of Classification Search .................... None
See application file for complete search history.

(56) References Cited

U.S. PATENT DOCUMENTS

| 7,421,125 | B1 * | 9/2008 | Rees ............................... 382/181 |
| 7,808,478 | B2 * | 10/2010 | Choi et al. .................... 345/158 |
| 7,894,662 | B2 | 2/2011 | Bushell et al. ................. 382/154 |
| 2002/0114425 | A1 | 8/2002 | Lang et al. ....................... 378/56 |
| 2003/0195883 | A1 | 10/2003 | Mojsilovic et al. ................. 707/6 |
| 2005/0100209 | A1 | 5/2005 | Lewis et al. .................... 382/159 |
| 2006/0039593 | A1 | 2/2006 | Sammak et al. ............... 382/133 |
| 2006/0177149 | A1 * | 8/2006 | Friedhoff et al. .............. 382/274 |
| 2007/0176940 | A1 | 8/2007 | Maxwell et al. ............... 345/589 |
| 2007/0176941 | A1 * | 8/2007 | Maxwell et al. ............... 345/589 |
| 2007/0177797 | A1 * | 8/2007 | Smith et al. .................... 382/164 |
| 2007/0242878 | A1 | 10/2007 | Maxwell et al. ............... 382/168 |
| 2008/0075371 | A1 * | 3/2008 | Dana et al. ..................... 382/199 |
| 2009/0161950 | A1 | 6/2009 | Dana et al. ..................... 382/165 |
| 2009/0196510 | A1 | 8/2009 | Gokturk et al. ................. 382/224 |
| 2009/0208106 | A1 | 8/2009 | Dunlop et al. ................. 382/173 |

(Continued)

OTHER PUBLICATIONS

Gomez, Image Segmentation Using Automatic Seeded Region Growing and Instance-based Learning, 2007, Proceedings of the Congress on pattern recognition 12th Iberoamerican conference on Progress in pattern recognition, image analysis and applications, pp. 1-10.*

(Continued)

Primary Examiner — Andrew W Johns
Assistant Examiner — David F Dunphy
(74) Attorney, Agent, or Firm — Davidson, Davidson & Kappel, LLC

(57) ABSTRACT

In a first exemplary embodiment of the present invention, an automated, computerized method is provided for processing an image. According to a feature of the present invention, the method comprises the steps of providing an image file depicting an image, in a computer memory, assembling a feature vector for the image file, the feature vector containing information regarding a likelihood that a selected pair of regions of the image file are of a same intrinsic characteristic, providing a classifier derived from a computer learning technique, computing a classification score for the selected pair of regions of the image file, as a function of the feature vector and the classifier and classifying the regions as being of the same intrinsic characteristic, as a function of the classification score.

13 Claims, 19 Drawing Sheets

U.S. PATENT DOCUMENTS

2010/0091943 A1\* 4/2010 Kang et al. ............... 378/41
2011/0142328 A1 6/2011 Friedhoff et al. ............. 382/154

OTHER PUBLICATIONS

Jeon, Image segmentation by unsupervised sparse clustering, 2006, Pattern Recognition Letters 27 (2006), pp. 1650-1664.\*

G. N. Lance and W. T. Williams "A General Theory of Classificatory Sorting Strategies: I. Hierarchical Systems" The Computer Journal 1967 9 (4) pp. 373-380.

H. G. Barrow and J. M. Tenenbaum. Recovering intrinsic scene characteristics from images. In A. R. Hanson and E. M. Riseman, editors, Computer Vision Systems, pp. 3-26, New York, 1978. Academic Press.

Y.-C. Chung, J.-M. Wang, R. R. Bailey, S.-W. Chen, S.-L.Chang, and S. Cherng. Physics-based extraction of intrinsic images from a single image. In ICPR, pp. 693-696, 2004.

B. V. Funt, M. S. Drew, and M. Brockington. Recovering shading from color images. In ECCV, pp. 124-132, May 1992.

A. Olmos and F. A. A. Kingdom. A biologically inspired algorithm for the recovery of shading and reflectance images. Perception, 33:1463-1473, 2004.

L. Shen, P. Tan, and S. Lin. Intrinsic image decomposition with non-local texture cues. In CVPR, 2008.

M. F. Tappen, E. H. Adelson, and W. T. Freeman. Estimating intrinsic component images using non-linear regression. In CVPR, 2006.

M. F. Tappen, W. T. Freeman, and E. H. Adelson. Recovering intrinsic images from a single image. In NIPS, pp. 1367-1374, 2003.

M. F. Tappen, W. T. Freeman, and E. H. Adelson. Recovering intrinsic images from a single image. PAMI, 27(9):1459-1472, 2005.

Y. Weiss and W. T. Freeman. What makes a good model of natural images? In CVPR, 2007.

L. Xu, F. Qi, and R. Jiang. Shadow removal from a single image. In ISDA, vol. 2, 2006.

Abdi, H., Z-scores, in N.J. Salkind (Ed.), Encyclopedia of Measurement and Statistics, Thousand Oaks, CA: Sage, (2007).

Zvi Galil and Giuseppe F. Italiano. Data structures and algorithms for disjoint set union problems, ACM Computing Surveys, vol. 23, Issue 3 (Sep. 1991), pp. 319-344.

M. A. Fischler, R. C. Bolles. Random Sample Consensus: A Paradigm for Model Fitting with Applications to Image Analysis and Automated Cartography. Comm. of the ACM, vol. 24, pp. 381-395, 1981.

Peter J. Rousseeuw, Least Median of Squares Regression, Journal of the American Statistical Association, vol. 79, No. 388 (Dec. 1984), pp. 871-880.

P. Felzenszwalb and D. Huttenlocher, Distance Transforms of Sampled Functions, Cornell Computing and Information Science Technical Report TR2004-1963, Sep. 2004.

\* cited by examiner

Pixel Array for Storing Image Data

| | | | | |
|---|---|---|---|---|
| P(1, 1) | P(1, 2) | ••• | ••• | P(1, M) |
| P(2, 1) | P(2, 2) | | | • |
| P(3, 1) | P(3, 2) | | | • |
| • | | | | |
| • | | | | |
| • | | | | |
| • | | | | • |
| • | | | | • |
| • | | | | • |
| P(N, 1) | ••• | | ••• | P(N, M) |

Image File
~18

FIG. 2

Examples of Identifying Token Regions in an Image

Original Image

- ⊗ Teal In Shadow
- ⊙ Teal
- ⊖ Blue In Shadow
- ⊘ Blue
- ⊖ Yellow

Token Regions $$\begin{bmatrix} 1 & -1 & 0 \\ 1 & 0 & -1 \\ 0 & 1 & -1 \end{bmatrix} \begin{bmatrix} m_a \\ m_b \\ m_c \end{bmatrix} = \begin{bmatrix} i_a - i_b \\ i_a - i_c \\ i_b - i_c \end{bmatrix}$$

[A]  [x]  =  [b]

METHOD AND SYSTEM FOR LEARNING A SAME-MATERIAL CONSTRAINT IN AN IMAGE

BACKGROUND OF THE INVENTION

Many significant and commercially important uses of modern computer technology relate to images. These include image processing, image analysis and computer vision applications. A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object within an image has been a persistent challenge to scientists. Such an ability can be particularly critical, for example, in computer vision applications, as may be implemented in a robot or a security camera used to identify objects moving through a selected field of view. A computer must be able to identify structures and features of a scene that can be modified in appearance due to overlying shadows. Cognitive processing of the human brain makes it possible for humans to automatically distinguish shadow from object. However, to a computer, it is all pixel values of varying color characteristics. Accordingly, there is a persistent need for the development of accurate and correct techniques that can be utilized in the operations of computers relating to images, to provide improved image appearance.

SUMMARY OF THE INVENTION

The present invention provides a method and system implementing image processing techniques that utilize spatio-spectral information relevant to an image, to perform an operation to accurately and correctly identify and separate illumination and material aspects of the image.

In a first exemplary embodiment of the present invention, an automated, computerized method is provided for processing an image. According to a feature of the present invention, the method comprises the steps of providing an image file depicting an image, in a computer memory, assembling a feature vector for the image file, the feature vector containing information regarding a likelihood that a selected pair of regions of the image file are of a same intrinsic characteristic, providing a classifier derived from a computer learning technique, computing a classification score for the selected pair of regions of the image file, as a function of the feature vector and the classifier and classifying the regions as being of the same intrinsic characteristic, as a function of the classification score.

According to a further feature of the first exemplary embodiment of the present invention, the method comprises the further steps of defining a constraint between the regions, when a classification score indicates the regions as being of the same intrinsic characteristic, and performing an optimization operation as a function of the constraint to generate an intrinsic image corresponding to the image. The intrinsic image comprises an illumination image and/or a material image. As a further feature of the first exemplary embodiment, the same intrinsic characteristic comprises a same-material for the regions.

In a second exemplary embodiment of the present invention, a computer system is provided. The computer system comprises a CPU and a memory storing an image file containing an image. According to a feature of the present invention, the CPU is arranged and configured to execute a routine to assemble a feature vector for the image file, the feature vector containing information regarding a likelihood that a selected pair of regions of the image file are of a same intrinsic characteristic, provide a classifier derived from a computer learning technique, compute a classification score for the selected pair of regions of the image file, as a function of the feature vector and the classifier and classify the regions as being of the same intrinsic characteristic, as a function of the classification score.

In a third exemplary embodiment of the present invention, a computer program product is provided. According to a feature of the present invention, the computer program product is disposed on a computer readable media, and the product includes computer executable process steps operable to control a computer to: assemble a feature vector for an image file, the feature vector containing information regarding a likelihood that a selected pair of regions of the image file are of a same intrinsic characteristic, provide a classifier derived from a computer learning technique, compute a classification score for the selected pair of regions of the image file, as a function of the feature vector and the classifier and classify the regions as being of the same intrinsic characteristic, as a function of the classification score.

In a fourth exemplary embodiment of the present invention, a computer program product is provided. According to a feature of the present invention, the computer program product is disposed on a computer readable media, and the product includes computer executable process steps operable to control a computer to: train a classifier for use in a computer learning technique, as a function of feature vectors derived from image files from a training set, and coded ground truth versions of the image files of the training set.

In a fifth exemplary embodiment of the present invention, an automated, computerized method is provided for processing an image. According to a feature of the present invention, the method comprises the steps of providing an image file depicting an image, in a computer memory, identifying a set of indicia measuring one of similarities and dissimilarities for selected pairs of regions of the image, transforming similarity and dissimilarity information derived from the set to pairwise distances, performing a clustering operation as a function of the pairwise distances and defining same intrinsic characteristic constraints as a function of clusters.

In a sixth exemplary embodiment of the present invention, a computer program product is provided. According to a feature of the present invention, the computer program product is disposed on a computer readable media, and the product includes computer executable process steps operable to control a computer to: provide an image file depicting an image, in a computer memory, identify a set of indicia measuring one of similarities and dissimilarities for selected pairs of regions of the image, transform similarity and dissimilarity information derived from the set to pairwise distances, perform a clustering operation as a function of the pairwise distances and define same intrinsic characteristic constraints as a function of clusters.

In a seventh exemplary embodiment of the present invention, an automated, computerized method is provided for processing an image. According to a feature of the present invention, the method comprises the steps of providing an image file depicting an image, in a computer memory, identifying a set of indicia measuring one of similarities and dissimilarities for each of a series of selected pairs of regions of the image, selecting a pair of regions of the image from the series, performing a segregation of the image into intrinsic images, assuming a same intrinsic characteristic for the selected region, evaluating the intrinsic images according to preselected criteria, retaining the pair as being of the same intrinsic characteristic when the evaluation satisfies the criteria and repeating the selecting, performing, evaluating and retaining steps for each pair of the series.

In an eighth exemplary embodiment of the present invention, a computer program product is provided. According to a feature of the present invention, the computer program product is disposed on a computer readable media, and the product includes computer executable process steps operable to control a computer to: provide an image file depicting an image, in a computer memory, identify a set of indicia measuring one of similarities and dissimilarities for each of a series of selected pairs of regions of the image, select a pair of regions of the image from the series, perform a segregation of the image into intrinsic images, assuming a same intrinsic characteristic for the selected region, evaluate the intrinsic images according to preselected criteria, retain the pair as being of the same intrinsic characteristic when the evaluation satisfies the criteria and repeat the selecting, performing, evaluating and retaining steps for each pair of the series.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programed to carry out the steps of the methods of the present invention.

BRIEF DESCRIPTION OF THE DRAWINGS

FIG. 2 shows an n×m pixel array image file for an image stored in the computer system of FIG. 1.

DETAILED DESCRIPTION OF THE PREFERRED EMBODIMENTS

Figure 1:
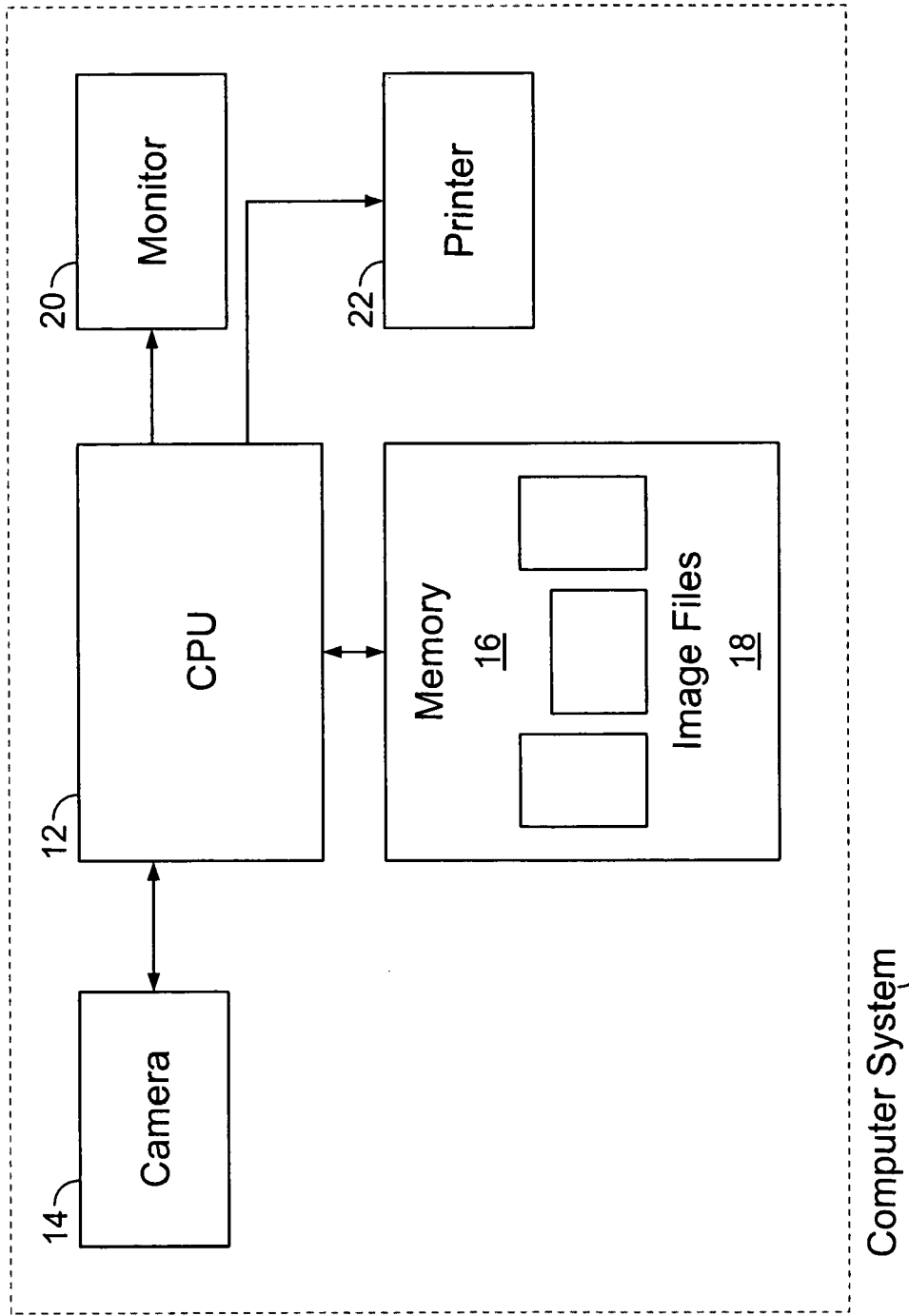
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p(1,1) and ending with the pixel p(n,m). When displaying or printing an image, the CPU 12 retrieves the corresponding image file 18 from the memory 16, and operates the monitor 20 or printer 22, as the case may be, as a function of the digital values of the pixels in the image file 18, as is generally known.

According to a feature of the present invention, in an image process, the CPU 12 operates to analyze and process information, for example, the RGB values of the pixels of an image stored in an image file 18, to achieve various objectives, such as, for example, a correct and accurate identification of illumination and material aspects of the image. The present invention provides a spatio-spectral operator/constraint/solver model to identify the illumination and material components of an image.

Figure 3:
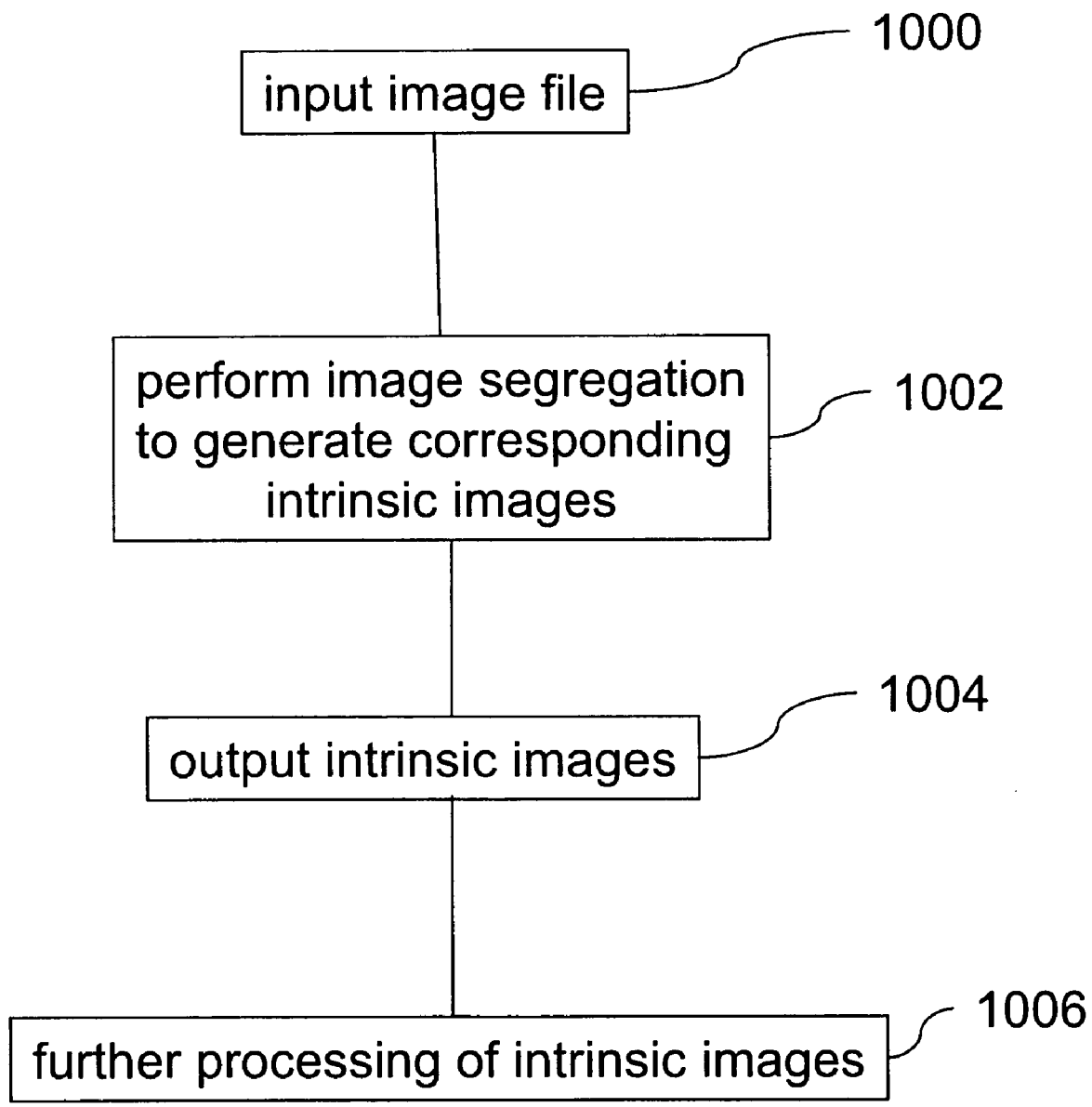
FIG. 3 is a flow chart showing a data flow in an automated computer operation to identify illumination and material aspects of an image, according to a feature of the present invention.

To that end, as shown in FIG. 3, in step 1000, an image file 18 is input to the CPU 12. In step 1002, the CPU 12 performs an image segregation, according to features of the present invention, to generate intrinsic images that correspond to the image depicted in the input image file 18. The intrinsic images include, for example, an illumination image, to capture the intensity and color of light incident upon each point on the surfaces depicted in the image, and a material image, to capture reflectance properties of surfaces depicted in the image (the percentage of each wavelength of light a surface reflects).

A fundamental observation underlying a basic discovery of the present invention, is that an image comprises two components, material and illumination. All changes in an image are caused by one or the other of these components. Spatio-spectral information is information relevant to contiguous pixels of an image depicted in an image file 18, such as spectral relationships among contiguous pixels, in terms of color bands, for example RGB values of the pixels, and the spatial extent of the pixel spectral characteristics relevant to a characteristic of the image, such as, for example, a single material depicted in the image or illumination flux effecting the image. When one of material and illumination is known in an image, the other can be readily deduced.

Moreover, the illumination flux includes an incident illuminant and an ambient illuminant. The spectra for the incident illuminant and the ambient illuminant can be different from one another. Thus, a spectral shift is caused by a shadow, i.e., a decrease of the intensity of the incident illuminant. The spectral shift can cause a variance in color of material depicted in the scene, from full shadow, through the shadow penumbra, to fully lit. Pursuant to a feature of the present invention, spectral shift phenomena is captured in spatio-spectral information. The spatio-spectral information includes a spectral ratio: a ratio based upon a difference in color or intensities between two areas of a scene depicted in an image, which may be caused by different materials (an object edge), an illumination change (illumination boundary) or both.

According to a further feature of the present invention, spatio-spectral operators are generated to facilitate the process for the segregation of illumination and material aspects of a scene depicted in the retrieved image file 18. Spatio-spectral operators comprise representations or characteristics of an image that encompass spatio-spectral information usable in the processing of material and illumination aspects of an image. The spatio-spectral operators are subject to constraints that define constraining spatio-spectral relationships between the operators, for input to a solver. The solver includes a mathematical processing engine that operates to obtain an optimized solution for the generation of an intrinsic image, such as a material image and/or an illumination image derived from the original image stored in the retrieved image file 18, as a function of the constraining relationships between the spatio-spectral operators.

Spatio-spectral operators include, for example, tokens, token map information, log chromaticity representation values, X-junctions, BIDR model representations, a boundary representation, and a texton histogram based pixel representation.

Pursuant to a feature of the present invention, a token is a connected region of an image wherein the pixels of the region are related to one another in a manner relevant to identification of image features and characteristics such as identification of materials and illumination. The use of tokens recognizes the fact that a particular set of material/illumination/geometric characteristics of an image extends beyond a single pixel, and therefore, while the image processing described herein can be done on a pixel level, tokens expedite a more efficient processing of image properties. The pixels of a token can be related in terms of either homogeneous factors, such as, for example, close correlation of color values among the pixels, or nonhomogeneous factors, such as, for example, differing color values related geometrically in a color space such as RGB space, commonly referred to as a texture. Exemplary embodiments of the present invention provide methods and systems to identify various types of homogeneous or nonhomogeneous tokens for improved processing of image files. The present invention utilizes spatio-spectral information relevant to contiguous pixels of an image depicted in an image file 18 to identify token regions.

According to one exemplary embodiment of the present invention, homogeneous tokens are each classified as either a Type A token, a Type B token or a Type C token. A Type A token is a connected image region comprising contiguous pixels that represent the largest possible region of the image encompassing a single material in the scene. A Type B token is a connected image region comprising contiguous pixels that represent a region of the image encompassing a single material in the scene, though not necessarily the maximal region corresponding to that material. A Type C token comprises a connected image region of similar image properties among the contiguous pixels of the token, for example, similar color and intensity, where similarity is defined with respect to a noise model for the imaging system used to record the image.

A linear token is a nonhomogeneous token comprising a connected region of the image wherein adjacent pixels of the region have differing color measurement values that fall within a cylinder in RGB space, from a dark end (in shadow) to a bright end (lit end), along a positive slope. The cylinder configuration is predicted by a bi-illuminant dichromatic reflection model (BIDR model), according to a feature of the present invention, when the color change is due to an illumination change forming a shadow (i.e. a decrease in the intensity of the incident illuminant as the interplay between the incident or direct illuminant and the ambient illuminant in the illumination field) over a single material of a scene depicted in the image.

For purposes of describing, identifying and using linear tokens, the BIDR model can be stated as: $I_{(x, y, z, \theta, \phi, \lambda)} = C_b(\lambda) l_d(\lambda)\gamma_b + M_a(\lambda)C_b(\lambda)$, where: $I_{(x, y, z, \theta, \phi, \lambda)}$ is the radiance of a surface point at (x, y, z) in the direction $\theta, \phi$ for the wavelength $\lambda$, $C_b(\lambda)$ is the geometry independent body reflectance of a surface for the wavelength $\lambda$, $l_d(\lambda)$ is the incident illuminant for the wavelength $\lambda$. $\gamma_b$ is the product of a shadow factor $s_{x, y, z}$ and a geometric factor $m_b(\theta i)$, and $M_a(\lambda)$ is the integral of the ambient illuminant and geometric body reflectance over a hemisphere, excluding the incident illuminant. For more detailed information on the BIDR model, reference should be made to U.S. application Ser. No. 11/341,751, filed Jan. 27, 2006, entitled: "Bi-illuminant Dichromatic Reflection Model For Image Manipulation," published as US 2007/0176940 on Aug. 2, 2007.

Token map information indicates locations of tokens within an image, relative to one another. The map information is used to identify neighboring tokens for performing an analysis of token neighbor relationships relevant to constraining spatio-spectral relationships between tokens, for input to the solver.

Log chromaticity representation values provide illumination invariant values for pixels of the image. Logarithmic values of the color band values of the image pixels are plotted on a log-color space graph. The logarithmic values are then projected to a log-chromaticity projection plane oriented as a function of the BIDR model. The chromaticity plane values are substituted for the color band values (for example, RGB values) of each pixel. For more detailed information on log chromaticity representation values, reference should be made to U.S. application Ser. No. 11/403,719, filed Apr. 13, 2006, entitled: "Method And System For Separating Illumination And Reflectance Using a Log Color Space," published as US 2007/0242878 on Oct. 18, 2007.

An X-junction is an area of an image where a material edge and an illumination boundary cross one another. An X-junction is an optimal location for an accurate analysis of material and illumination aspects of an image.

A boundary representation is an arrangement of pixels, on each side of a boundary, formed by, for example, adjacent Type B tokens. The arrangement is used to facilitate an analysis of the boundary to classify the boundary as a material boundary on a smooth surface (as opposed to another type of boundary, for example, an illumination edge, depth boundary or simultaneous illumination and material change). The pixel representation is configured to provide samples of pixels within each of the Type B tokens forming the boundary. The pixels of the samples are subject to spatio-spectral analysis, and the results are compared to determine the likelihood that the respective boundary corresponds to a material change.

A texton is a homogeneous representation for a region of an image that comprises a texture. Image texture can be defined as a function of spatial variation in pixel intensities. Image texture patterns are frequently the result of physical or reflective properties of the image surface. Commonly, an image texture is associated with spatial homogeneity and typically includes repeated structures, often with some random variation (e.g., random positions, orientations or colors). Image textures are also often characterized by certain visual properties such as regularity, coarseness, contrast and directionality. An example of image texture is the image of a zebra skin surface as it appears to be spatially homogenous and seems to contain variations of color intensities which form certain repeated patterns. Some image textures can be defined by geometric characteristics, such as stripes or spots. A texton based operator transforms patterns of differing reflectance caused by a textured material into a homogeneous representation that captures the spectral and spatial characteristics of the textured region in the image.

Constraints comprise, for example, an anchor constraint, a same illumination constraint, a smooth illumination constraint, a Type B token constraint, a Linear token constraint, a BIDR enforcement constraint, a same texton histogram constraint, a log chromaticity similarity constraint, an X junction constraint, and a boundary representation constraint. Each constraint is configured as a constraint generator software module that defines the spatio-spectral operators utilized by the respective constraint and provides an expression of the constraining relationship imposed upon the constituent operators.

An anchor constraint utilizes a number of brightest/largest Type C tokens in an image. The constraining relationship is that the material of the selected brightest/largest Type C tokens is constrained to be an absolute value for the color/brightness observed in the image. The constraint anchors a material map for the image at an absolute brightness to avoid relative brightness constraints.

A same illumination constraint utilizes Type C tokens and Type B tokens identified in an image and token map information. The constraining relationship is that adjacent Type C tokens, as indicted by the token map information, are at the same illumination, unless the adjacent Type C tokens are part of the same Type B token. The term "same" in connection with the term "illumination" is used to mean an average value with respect to a noise model for the imaging system used to record the image. This constrains any observed differences in appearance between adjacent Type C tokens, that are not part of the same Type B token, to be a material change, as will appear.

A smooth illumination constraint is similar to the same illumination constraint. However, rather than constraining all pixels of adjacent Type C tokens to be of the same illumination, as in the same illumination constraint, in the smooth illumination constraint, the constraint is based upon the average illumination of the pixels near a shared boundary between adjacent Type C tokens. This constrains the illumination field to be somewhat smooth, as opposed to piecewise constant (the same, as defined above) throughout a token.

A Type B token constraint also utilizes Type C tokens and Type B tokens. However, the constraining relationship is that all Type C tokens that are part of the same Type B token are constrained to be of the same material. This constraint enforces the definition of a Type B token, that is, a connected image region comprising contiguous pixels that represent a region of the image encompassing a single material in the scene, though not necessarily the maximal region corresponding to that material. Thus, all Type C tokens that lie within the same Type B token are by the definition imposed upon Type B tokens, of the same material, though not necessarily of the same illumination. The Type C tokens are therefore constrained to correspond to observed differences in appearance that are caused by varying illumination.

Accordingly, the Type B token constraint is complementary to the same and smooth illumination constraints, which, as opposed to illumination change, constrain observed differences to correspond to material change, as described above. This is due to the fact that in each of the same and smooth illumination constraints, Type C tokens that are adjacent and not part of the same Type B token, are constrained to the same illumination. These Type C tokens should comprise different materials, since by the constraint, they are not in the same Type B token and therefore, by the definition of Type B tokens enforced by the constraint, do not encompass a single material, so illumination should be a constant, and any observed difference is considered as attributable to a material change.

To summarize, pursuant to a feature of the present invention, the Type C and Type B token spatio-spectral operators are defined to provide characteristics of an image that enable segregation of illumination and material. Type C tokens each comprise a connected image region of similar image properties, for example similar color, as recorded and stored in an image file 18. Thus, adjacent Type C tokens indicate some form of change in the image or else they would form the same Type C token. Type B tokens encompass a single material. The complementary constraints of the same/smooth illumination constraints and the Type B token constraint enforce relationships between the tokens that indicate either a material change or an illumination change.

If the adjacent Type C tokens are within the same type B token, as in the Type B token constraint, the differences between them should correspond to illumination change due to the same-material property of the common Type B token. If the adjacent Type C tokens are not within the same Type B token, as in the same/smooth illumination constraints, the difference between them should then correspond to a material change since they are not both defined by a common, single material Type B token.

A Linear token constraint utilizes Type C tokens and Linear tokens. The constraining relationship is that a difference between two Type C tokens, spaced by a Linear token, approximately equals a characteristic illuminant spectral ratio for the image. As defined, a Linear token follows a cylinder configuration along a positive slope, through color space. The BIDR model predicts that the positive slope equals a characteristic illuminant spectral ratio for the image. Thus, the color difference between two Type C tokens, one at each of the dark end and bright end of a Linear token, should reflect the value of the respective characteristic illuminant spectral ratio for the image.

A BIDR enforcement constraint utilizes Type C tokens and a BIDR model defined normal vector for the log-chromaticity projection plane. The constraining relationship is that the illumination for all Type C tokens in a local patch of the image forms a set of parallel lines in log-color space, the orientation of the parallel lines being defined by the BIDR model defined normal vector. The constraint therefore enforces the illumination field present in the image to explicitly fit the BIDR model prediction for the illumination.

Thus, each of the Linear token constraint and the BIDR enforcement constraint utilize BIDR model predictions as a basis to segregate illumination and material aspects of an image. The BIDR model predicts a color change in an image when the color change is due to an illumination change forming a shadow (i.e. a decrease in the intensity of the incident illuminant as the interplay between the incident or direct illuminant and the ambient illuminant in the illumination field) over a single material of a scene depicted in the image. The color change prediction of the BIDR model accurately constrains all color band variations among Type C tokens to illumination field effects occurring in an image by operating as a function of the interplay between the spectral variations occurring between incident illuminant and ambient illuminant components of the illumination field. Thus, BIDR model based constraints couple all color band variations into one integral constraining relationship.

A same texton histogram constraint utilizes Type C tokens and texton histogram operators identified for texture regions within an image. A texton analysis is utilized wherein each pixel of the image (or pixels of those regions of an image identified as comprising a texture) from the recorded color band representation of the respective image file 18, such as, for example, RGB color band values, is converted to a two band representation wherein the two bands comprise a texton label and a texton histogram label. The two band representations are then used to identify texture tokens, as will be described below. A constraint can be imposed that all Type C tokens within the same texture token are of the same mean material.

A log chromaticity similarity constraint utilizes Type C tokens and log chromaticity representation values. The constraining relationship is that those Type C tokens having pixels with similar log chromaticity representation values are constrained to a same color value, with observed differences being attributed to variations in the illumination field.

An X-junction constraint utilizes Type C tokens and X-junction operators. As noted above, an X-junction is an area of an image where a material edge and an illumination boundary cross one another. X-junctions are typically identified by four Type C tokens, two pairs of same-material Type C tokens forming the material edge, with each same-material pair including an illumination boundary dividing the respective same material into lit and shadowed pairs of Type C tokens. The constraining relationship: 1) a Type B token constraint is imposed between each same-material pair of Type C tokens forming the X-junction (those with an illumination boundary between them), and 2) a same illumination constraint is imposed between each pair of Type C tokens forming the material edge of the X-junction. For a more detailed description of X-junctions and the relationships of constituent tokens, reference should be made to U.S. application Ser. No. 11/341,742, filed Jan. 27, 2006, entitled: "Method And System For Identifying Illumination Flux In An Image," published as US 2006/0177149 on Aug. 10, 2006.

A boundary representation constraint is defined by a standard ratio constraint. An analysis performed on a boundary representation, when indicating a material change, provides an estimate of the ratio of colors between two adjacent regions defined by the boundary, for example, the adjacent Type B tokens, even when the illumination varies over the regions. The constraint states that the ratio of the colors of two adjacent regions is X. The boundary representation analysis is executed at the level of Type B tokens, to classify a boundary as being caused by a material change, then propagated down to the level of the constituent Type C tokens. For a more detailed description of a boundary analysis, at the Type B token level, reference should be made to U.S. application Ser. No. 12/079,878, filed Mar. 28, 2008, entitled "System and Method For Illumination Invariant Image Segmentation."

According to a feature of the present invention, the boundary representation constraint states that all adjacent pairs of Type C tokens along the boundary, (one Type C token on each side of the boundary, and all of the Type C tokens being within the Type B tokens forming the respective boundary), have colors that satisfy the ratio X, as indicated by the boundary representation analysis.

According to a preferred embodiment of the present invention, each of the above described constraints can be classified into one of three basic types of constraints, an absolute material color constraint, a same-material constraint and a relative reflectance constraint. The absolute material constraint constrains the material at a particular location of an image to be a certain color, as implemented in, for example, the anchor constraint. The same-material constraint constrains operators relevant to an image (for example, two pixels or Type C tokens) to be of the same material. The same-material type of constraint can be implemented in, for example, Type B, X-junction, log chromaticity similarity, same texton histogram and linear token constraints. The relative reflectance constraint constrains operators relevant to an image (for example, two pixels or Type C tokens) to have a similarity of reflectance characteristics, such as defined by smooth illumination and same illumination constraints, and which can be specified by X-junction, and boundary representation constraints.

An exemplary solver according to a feature of the present invention comprises a mathematical processing engine for executing an optimizing function, for example, optimization of results in an equation expressed by: [A][x]=[b], where [A] is a matrix of values that are to be satisfied by (and therefore, taken as solved for by) the definitions of the operator(s) and the constraining relationship(s) for the operator(s), as indicated by selected constraint(s), [x] is a matrix of variables for which the equation is finding an optimal solution, for example, one of an illumination or material component of an image component, for example, a pixel or token, and [b] is a matrix of values observed in an image selected for processing, for example, the recorded values for the RGB color bands of each pixel of an image file 18. The optimizing equation can be implemented in a mathematical optimizing function selected from a set of known optimization solvers such as, for example, known convex optimization operations such as a least squares solver, or a preconditioned conjugate gradient solver.

According to a further feature of the present invention, factors including bounds, are introduced in a solver operation, in addition to constraining relationships, as a function of real world illumination and material phenomena, to keep material/illumination values within physically plausible ranges, such as a limit1, limit infinity solver ($L_1$, $L_\infty$), a bounded least squares solver, or a bounded $L_1$, $L_\infty$ solver, as will be described below.

Figure 4:
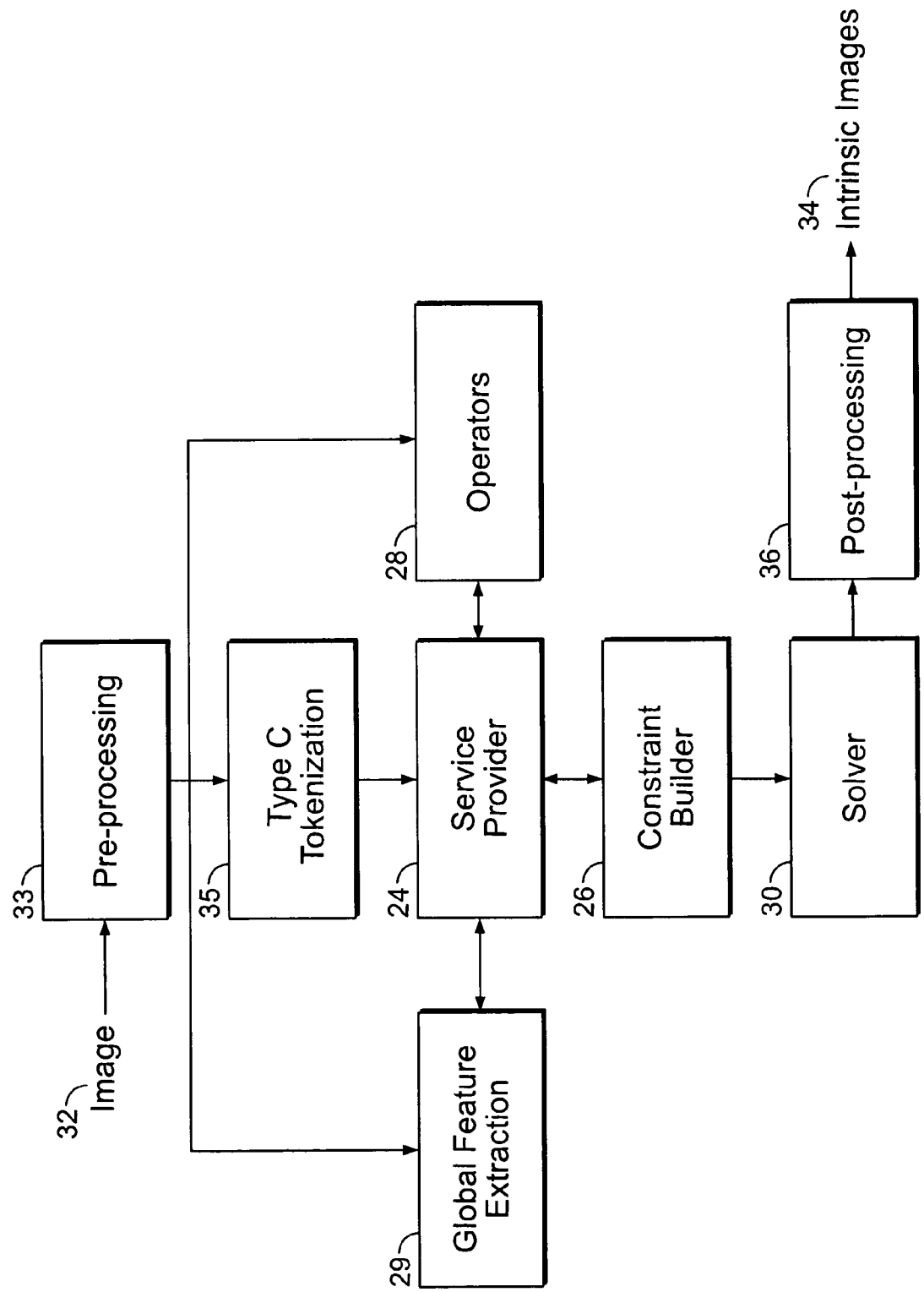
FIG. 4 is a functional block diagram of an image segregation system architecture, implemented in the computer system of FIG. 1, for performance of the computer operation of FIG. 3, according to a feature of the present invention.

FIG. 4 shows a functional block diagram of an image segregation system architecture, implemented in, for example, the computer system of FIG. 1, according to a feature of the present invention. Alternatively, the functional blocks of FIG. 4 can be implemented in a dedicated hardware circuit arranged to perform the functionality of the blocks of FIG. 4. An image 32 (as depicted in an image file 18) is input to a preprocessing block 33. The preprocessing block 33 can perform such functions as correction of chromatic aberration in the image 32, combining multiple images to provide a high dynamic range image, linearize pixel data for the image, and so on, for an image optimized for processing. The pre-processed image is then input to a Type C tokenization block 35 which operates to identify Type C tokens in the pre-processed image, in the manner described below. Type C tokens are common to many of the constraints utilized in exemplary embodiments of the present invention, thus, an initial identification of Type C tokens for an input image 32 expedites further processing.

In an exemplary embodiment of the present invention, the CPU 12 executes code to implement both the preprocessing block 33 and the Type C tokenization block 35, as well as a service provider 24, that functions as a central agent and caching structure (configured in the memory 16), to handle an image for processing according to the teachings of the present invention. The service provider 24 receives and stores the pre-processed image and related Type C token information from the Type C tokenization block 35, and is coupled to an operators block 28 (executed by the CPU 12) arranged to generate any other operators for the image required by selected constraints, as will appear. The service provider 24 is also coupled to a global features extraction input 29. The global features extraction input 29 can be used to provide the system with information relevant to an image being processed, such as an indication of light source when the image was taken (sunlight, fluorescent light, incandescent light), time of day, location, domain knowledge, such as information relevant to the nature of the image, such as interior, exterior, buildings, lawns with green grass, trees with leaves in bloom, etc., and any other parameters relevant to image processing.

The service provider 24 stores the global features extraction input 29 with a related input image 32.

A constraint builder 26 is coupled to the service provider 24. The constraint builder 26 uses a constraint generator library (configured within the memory 16) that stores the constraint generator software modules for the various constraints described above. The service provider 24 and constraint builder 26 operate to arrange spatio-spectral operators relevant to the pre-processed image, according to selected ones of the constraint generator software modules, in for example, the [A][x]=[b] matrix equation.

A solver 30 (executed by the CPU 12) is coupled to the constraint builder 26, and implements an optimization operation, as described above, for an optimal solution for the [A][x]=[b] matrix equation, for use in generating intrinsic images from the pre-processed image. The solver 30 is also coupled to a post-processing block 36 (executed by the CPU 12) for certain post-processing operations. The post-processing operations can include, for example, monotonicity maintenance. In monotonicity maintenance, if two large regions exhibit a linear transition in the input image 32, the transition should remain a linear transition in the output intrinsic image 34. Post-processing can also include illumination propagation, that serves to fill in holes left by the solver 30, illumination-map based white balancing and other filtering, smoothing processes. The post-processing block 36 outputs intrinsic images 34.

Figure 5:
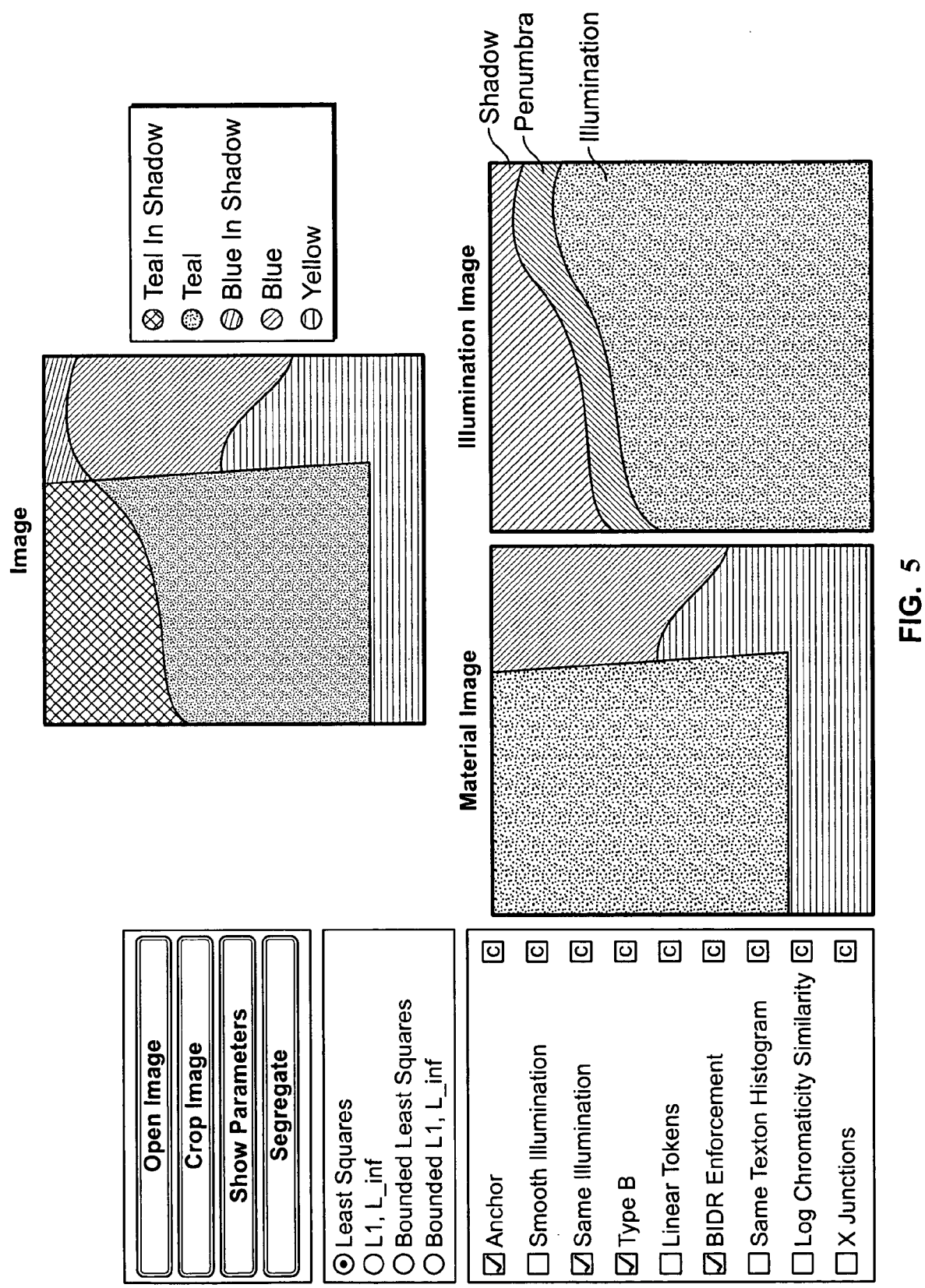
FIG. 5 shows a graphical user interface for use in connection with an implementation of the image segregation system architecture feature of the present invention.

Referring now to FIG. 5, there is shown a graphical user interface (GUI) for use in connection with an exemplary implementation of the image segregation system architecture feature of the present invention. The GUI of FIG. 5 is displayed on the monitor 20 of the computer system 10 by the service provider 24 for a user to select a desired image segregation operation. The upper left hand corner of the GUI indicates Open Image, Crop Image, Show Parameters, and Segregate selection indicators. A user can move and click a cursor on a desired selector indicator. The Open Image indicator lists all image files 18 currently stored in the memory 16 and enables the user to select an image for processing. The selected image is input 32 (see FIG. 4) to the service provider 24 (via the preprocessing block 33 and the Type C tokenization block 35) which operates to display the selected image at the upper center of the monitor 20 (FIG. 5).

A material image derived by operation of the exemplary segregation system from the selected image is output 34 (see FIG. 4) after execution of the image segregation processing by the solver 30 and displayed at the lower right hand of the monitor 20 (FIG. 5). The derived illumination image is displayed at the lower right hand of the monitor 20 (FIG. 5).

According to a feature of the present invention, the Crop Image selector permits a user to crop a selected image so as to process a portion of the overall image. The Show Parameter selector displays parameters related to the selected image file 18. Parameters for each image file 18 can be stored in a parameter data file associated with a corresponding image file 18, and include any parameters relevant to the processing of the image depicted in the associated image file 18, for example the global features extraction input 29. Parameters can include any data relevant to image processing such as, for example, any variable for pixel analysis by the CPU 12, as for example, in the generation of spatio-spectral operators, and domain knowledge, such as information relevant to the nature of the image, such as interior, exterior, buildings, lawns with green grass, trees with leaves in bloom, etc.

Below the selection indicators is a list of each of the optimizing functions that can be used as the solver 30, and a further list of each of the constraint generators contained in the constraint generator library of the constraint builder 26. A user selects a desired mathematical operation and one or more of the constraints to be imposed upon the selected image. After selection of the image to be processed, the constraints to be imposed and the mathematical operation to be executed, the user can click on the Segregate indicator to commence image segregation processing.

Upon commencement of the image segregation processing, the service provider 24 retrieves the constraint generator software modules for the selected constraints to identify the spatio-spectral operators utilized by the selected constraints. Any spatio-spectral operators not already stored by the service provider 24 are generated by the operators block 28, for the image being segregated, and the service provider 24 caches the results. The cached results can be reused in any subsequent operation for a selected image, with the same set of associated parameters.

For example, if the selected constraint is a same illumination constraint, the service provider 24 identifies Type C tokens, Type B tokens and a token map for the selected image. The Type C tokens were generated by the Type C tokenization block 35. The service provider 24 operates the operators block 28 to generate the remaining operators specified by the same illumination constraint.

Figure 6A:
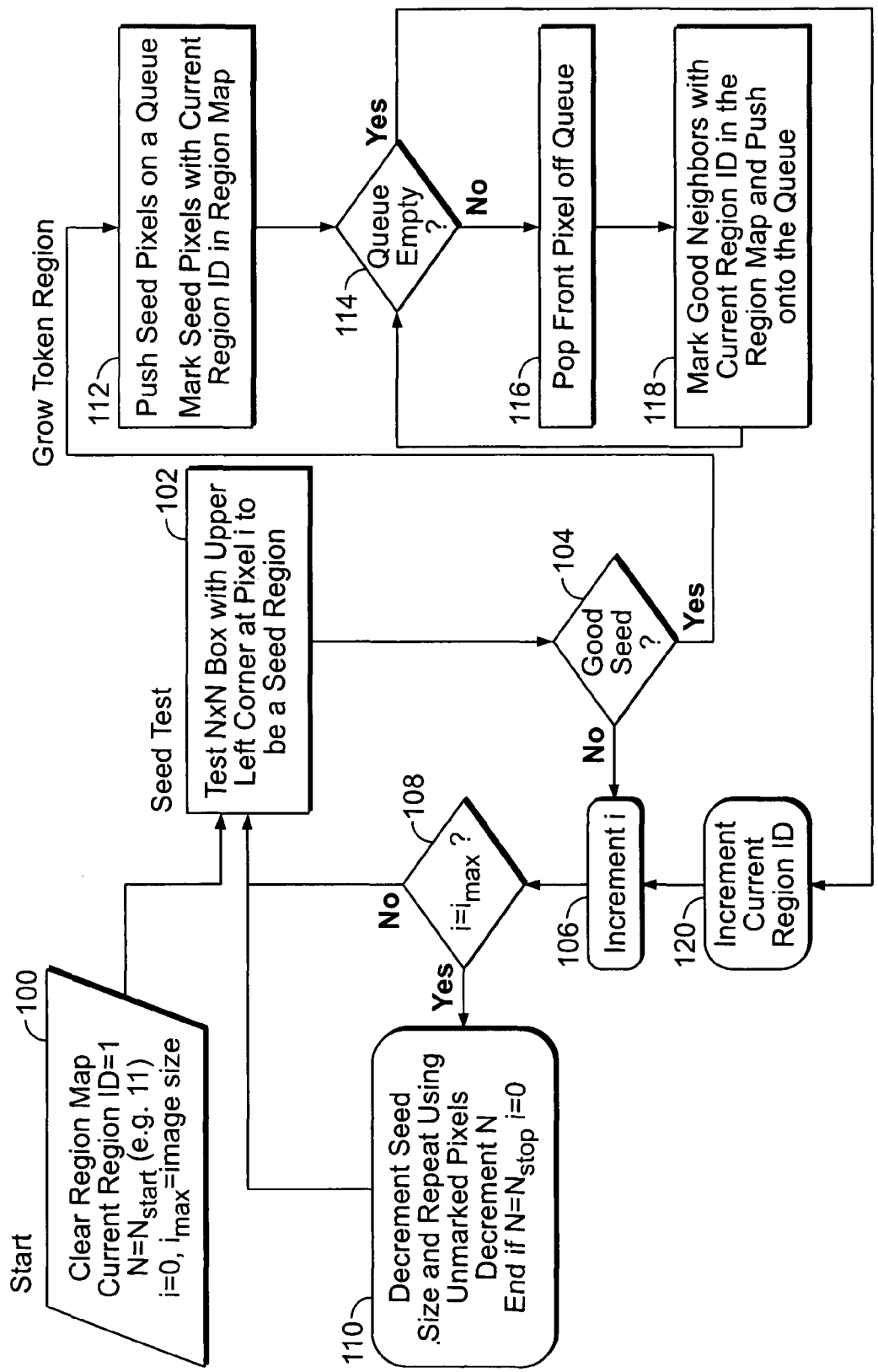
FIG. 6a is a flow chart for identifying Type C token regions in the image file of FIG. 2a, according to a feature of the present invention.

Referring now to FIG. 6a, there is shown a flow chart for generating Type C token regions in the image file of FIG. 2, according to a feature of the present invention. Type C tokens can be readily identified in an image by the Type C tokenization block 35, utilizing the steps of FIG. 6a. The operators block 28 can then analyze and process the Type C tokens to construct Type B tokens when specified by a selected constraint, as will appear.

Prior to execution of the routine of FIG. 6a, the CPU 12 can operate to filter the image depicted in a subject image file 18. The filters may include an image texture filter, to, for example, transform patterns of differing reflectance caused by a textured material into a homogeneous representation that captures the spectral and spatial characteristics of the textured region in the image. Identification of Type B tokens can be difficult in an image texture. A textured image contains materials with, for example, more than one reflectance function that manifests as a defining characteristic. For example, the defining characteristic can be a pattern of colors within the texture, such that the texture displays a certain distribution of colors in any patch or region selected from anywhere within the textured region of the image.

A $1^{st}$ order uniform, homogeneous Type C token comprises a single robust color measurement among contiguous pixels of the image. At the start of the identification routine of FIG. 6a, the CPU 12 (executing as the Type C tokenization block 35) sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, N=$N_{start}$. $N_{start}$ can be any integer >0, for example it can be set at set at 11 or 15 pixels.

At step 102, a seed test is begun. The CPU 12 selects a first pixel, i=(1, 1) for example (see FIG. 2a), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel or the filter output intensity histogram representation of the pixel, in the event the image was filtered for texture regions, as described above. If the comparison does not result in approximately equal values (for example, within the noise levels of the recording device for RGB values) for the pixels in the seed, the CPU 12 increments the value of i (step 106), for example, i=(1, 2), for a next N×N seed sample, and then tests to determine if i=$i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at i=(n,m). In this manner, the routine of FIG. 5a parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token. In the event the pixels comprise intensity histogram representations, the token can be marked as Type $C_T$.

When the queue is empty, the CPU 12 proceeds to step 120. At step 120, the CPU 12 increments the region ID for use with identification of a next token. The CPU 12 then returns to step 106 to repeat the routine in respect of the new current token region.

Figure 6B:
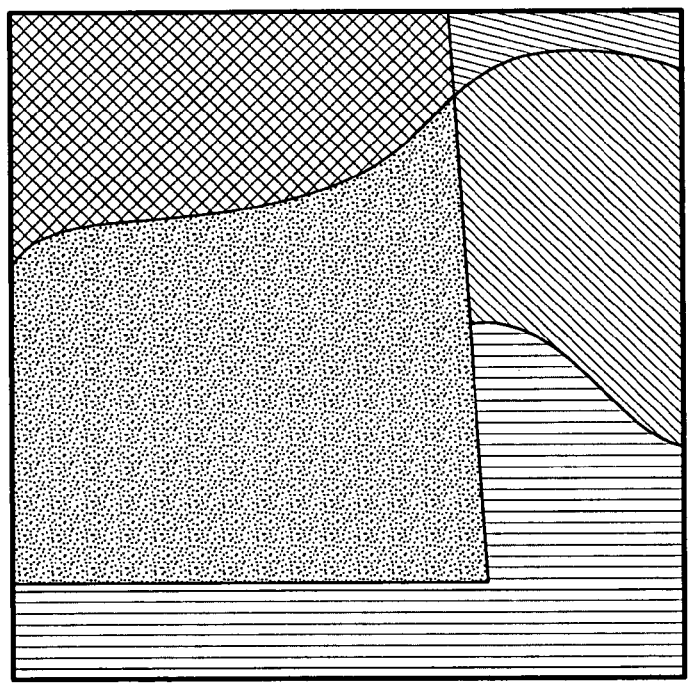
FIG. 6b is an original image used as an example in the identification of Type C tokens.
Figure 6C:
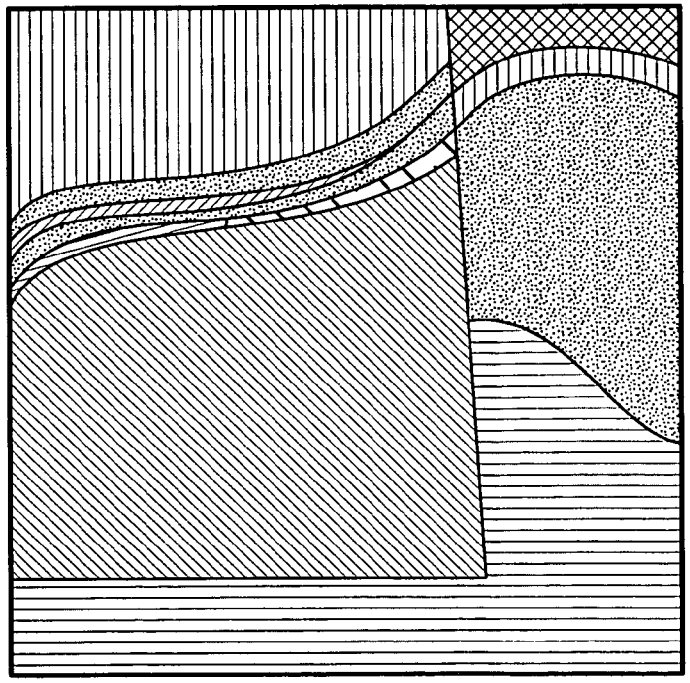
FIG. 6c shows Type C token regions in the image of FIG. 6b.

Upon arrival at N=$N_{stop}$, step 110 of the flow chart of FIG. 5a, or completion of a region map that coincides with the image, the routine will have completed the token building task. FIG. 6b is an original image used as an example in the identification of tokens. The image shows areas of the color blue and the blue in shadow, and of the color teal and the teal in shadow. FIG. 6c shows token regions corresponding to the region map, for example, as identified through execution of the routine of FIG. 6a (Type C tokens), in respect to the image of FIG. 6b. The token regions are color coded to illustrate the token makeup of the image of FIG. 6b, including penumbra regions between the full color blue and teal areas of the image and the shadow of the colored areas.

Upon completion of the routine of FIG. 6a by the Type C tokenization block 35, the service provider 24 stores the Type C token region information for the selected image. Prior to commencing any process to generate Type B tokens from the identified Type C tokens, the operators block 28 tests each identified Type C token to make certain that each Type C token encompasses a single material. While each Type C token comprises a region of the image having a single robust color measurement among contiguous pixels of the image, the token may grow across material boundaries.

Typically, different materials connect together in one Type C token via a neck region often located on shadow boundaries or in areas with varying illumination crossing different materials with similar hue but different intensities. A neck pixel can be identified by examining characteristics of adjacent pixels. When a pixel has two contiguous pixels on opposite sides that are not within the corresponding token, and two contiguous pixels on opposite sides that are within the corresponding token, the pixel is defined as a neck pixel.

Figure 6D:
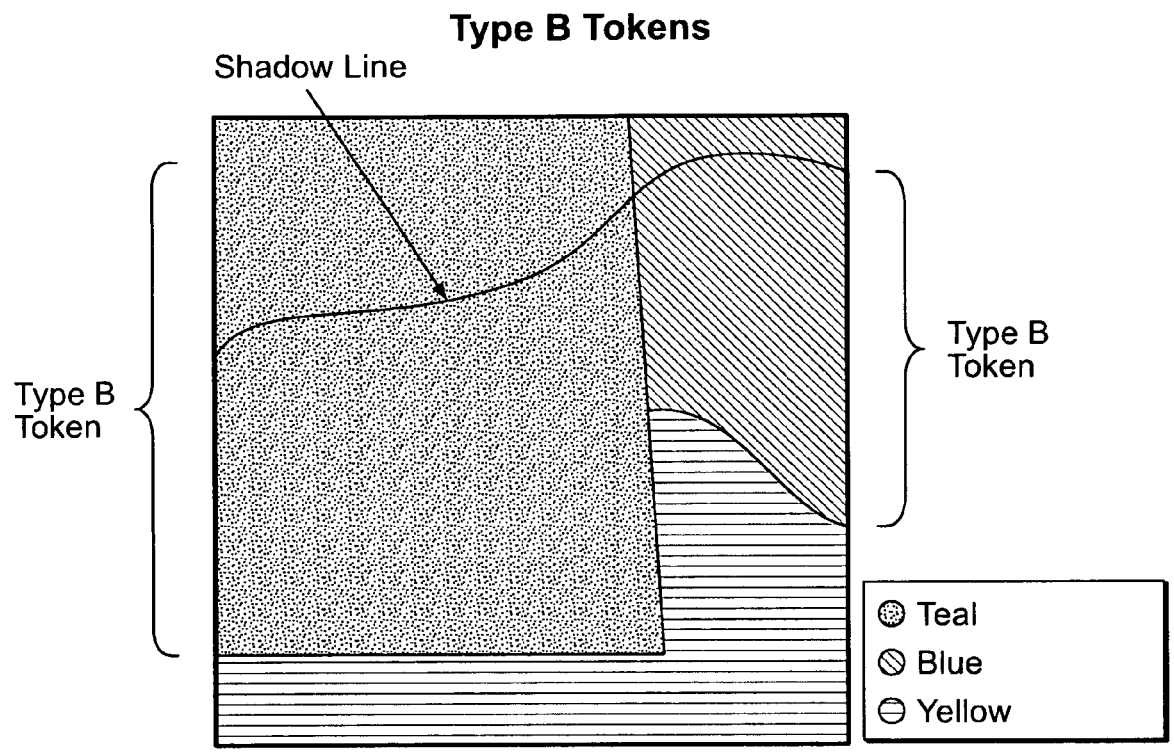
FIG. 6d shows Type B tokens, generated from the Type C tokens of FIG. 6c, according to a feature of the present invention.
Figure 7:
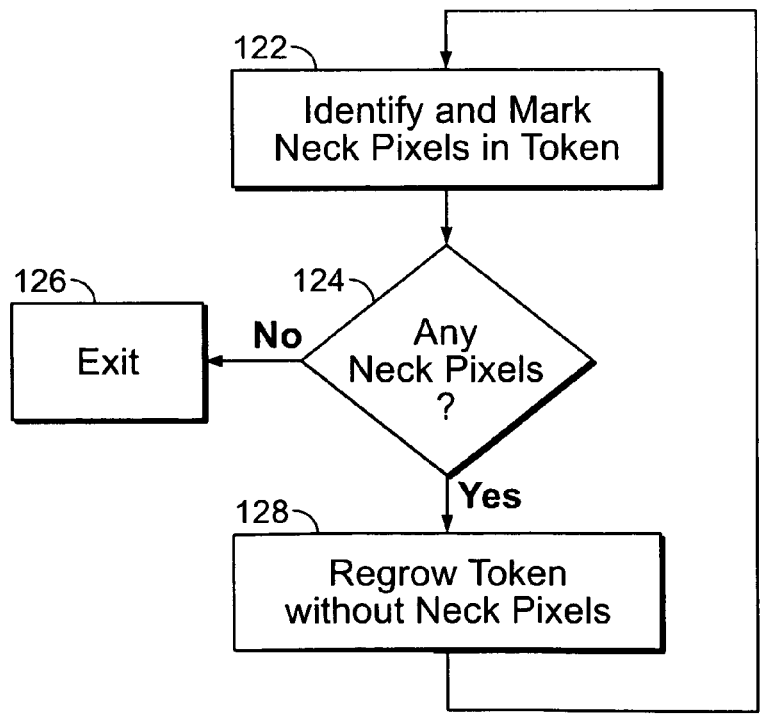
FIG. 7 is a flow chart for a routine to test Type C tokens identified by the routine of the flow chart of FIG. 6a, according to a feature of the present invention.

FIG. 7 shows a flow chart for a neck test for Type C tokens. In step 122, the CPU 12 examines each pixel of an identified token to determine whether any of the pixels under examination forms a neck. The routine of FIG. 6 can be executed as a subroutine directly after a particular token is identified during execution of the routine of FIG. 6*a*. All pixels identified as a neck are marked as "ungrowable." In decision block 124, the CPU 12 determines if any of the pixels were marked.

If no, the CPU 12 exits the routine of FIG. 7 and returns to the routine of FIG. 6*a* (step 126).

If yes, the CPU 12 proceeds to step 128 and operates to regrow the token from a seed location selected from among the unmarked pixels of the current token, as per the routine of FIG. 6*a*, without changing the counts for seed size and region ID. During the regrowth process, the CPU 12 does not include any pixel previously marked as ungrowable. After the token is regrown, the previously marked pixels are unmarked so that other tokens may grow into them.

Subsequent to the regrowth of the token without the previously marked pixels, the CPU 12 returns to step 122 to test the newly regrown token.

Neck testing identifies Type C tokens that cross material boundaries, and regrows the identified tokens to provide single material Type C tokens suitable for use in creating Type B tokens. FIG. 6*d* shows Type B tokens generated from the Type C tokens of FIG. 6*c*, according to a feature of the present invention. The present invention provides several exemplary techniques of pixel characteristic analysis for constructing Type B tokens from Type C tokens. One exemplary technique involves arbitrary boundary removal. The arbitrary boundary removal technique can be applied to Type C tokens whether they were generated using N color band values (RGB in our example) of the pixel or the filter output representation of the pixel, in the event the image was filtered. Actual boundaries of any particular Type C token will be a function of the seed location used to generate the token, and are thus, to some extent arbitrary. There are typically many potential seed locations for each particular token, with each potential seed location generating a token with slightly different boundaries and spatial extent because of differences among the color values of the pixels of the various seeds, within the noise ranges of the recording equipment.

Figure 8:
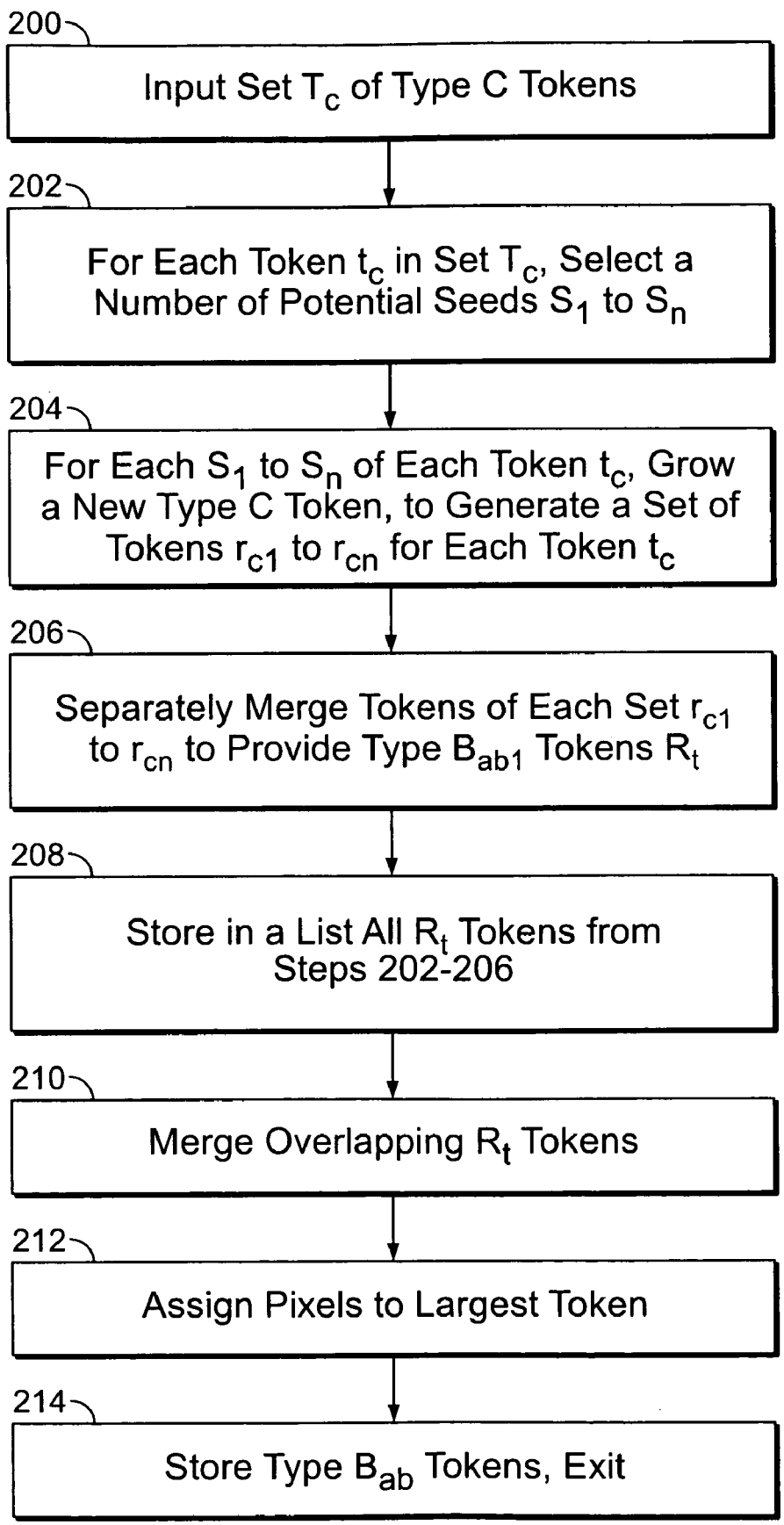
FIG. 8 is a flow chart for constructing Type B tokens via an arbitrary boundary removal technique, according to a feature of the present invention.

FIG. 8 is a flow chart for constructing Type B tokens via an arbitrary boundary removal technique, according to a feature of the present invention. In step 200, the CPU 12 is provided with a set ($T_c$) of Type C tokens generated with a seed size (S) via the routine of FIG. 6*a*, with neck removal via the routine of FIG. 7. The seed size $S=S_{max}$, for example, S=4 pixels. In step 202, for each Type C token, $t_c$ in the set $T_c$ the CPU 12 selects a number (for example 50) of potential seeds $s_1$ to $s_n$. In our example, each selected seed will be a 4×4 pixel array from within the token region, the pixels of the array being of approximately equal values (within the noise levels of the recording device).

In step 204, the CPU 12 grows a new Type C token, utilizing the routines of FIGS. 6*a* and 7, from each seed location, $s_1$ to $s_n$ of each token $t_c$ in the set $T_c$. The newly grown tokens for each token $t_c$ are designated as tokens $r_{c1}$ to $r_{cn}$. The newly grown tokens $r_{c1}$ to $r_{cn}$ for each token $t_c$ generally overlap the original Type C token $t_c$, as well as one another.

In step 206, the CPU 12 operates to merge the newly generated tokens $r_{c1}$ to $r_{cn}$ of each token $t_c$, respectively. The result is a new token $R_t$ corresponding to each original token $t_c$ in the set $T_c$. Each new token $R_t$ encompasses all of the regions of the respective overlapping tokens $r_{c1}$ to $r_{cn}$ generated from the corresponding original token $t_c$. The unions of the regions comprising the respective merged new tokens $R_t$ are each a more extensive token than the original Type C tokens of the set. The resulting merged new tokens $R_t$ result in regions of the image file 18, each of a much broader range of variation between the pixels of the respective token $R_t$ than the original Type C token, yet the range of variation among the constituent pixels will still be relatively smooth. $R_t$ is defined as a limited form of Type B token, Type $B_{ab1}$, to indicate a token generated by the first stage (steps 200-206) of the arbitrary boundary removal technique according to a feature of the present invention.

In step 208, the CPU 12 stores each of the Type $B_{ab1}$ tokens generated in steps 202-206 from the set of tokens $T_c$, and proceeds to step 210. Type $B_{ab1}$ tokens generated via execution of steps 202-206 may overlap significantly. In step 210, the CPU 12 operates to merge the $R_t$ tokens stored in step 208 that overlap each other by a certain percentage of their respective sizes. For example, a 30% overlap is generally sufficient to provide few, if any, false positive merges that combine regions containing different materials. The new set of merged tokens still may have overlapping tokens, for example, previously overlapping tokens that had a less than 30% overlap. After all merges are complete, the CPU 12 proceeds to step 212.

In step 212, the CPU 12 identifies all pixels that are in more than one token (that is in an overlapping portion of two or more tokens). Each identified pixel is assigned to the token occupying the largest region of the image. Thus, all overlapping tokens are modified to eliminate all overlaps.

In step 214, the CPU 12 (as the Type C tokenization block 35 or the operators block 28) stores the final set of merged and modified tokens, now designated as Type $B_{ab2}$ tokens, and then exits the routine. As noted above, the Type $B_{ab2}$ tokens were generated from Type C tokens whether the Type C tokens were generated using N color band values (RGB in our example) of the pixel or the filter output representation of the pixel, in the event the image was filtered.

Figure 9:
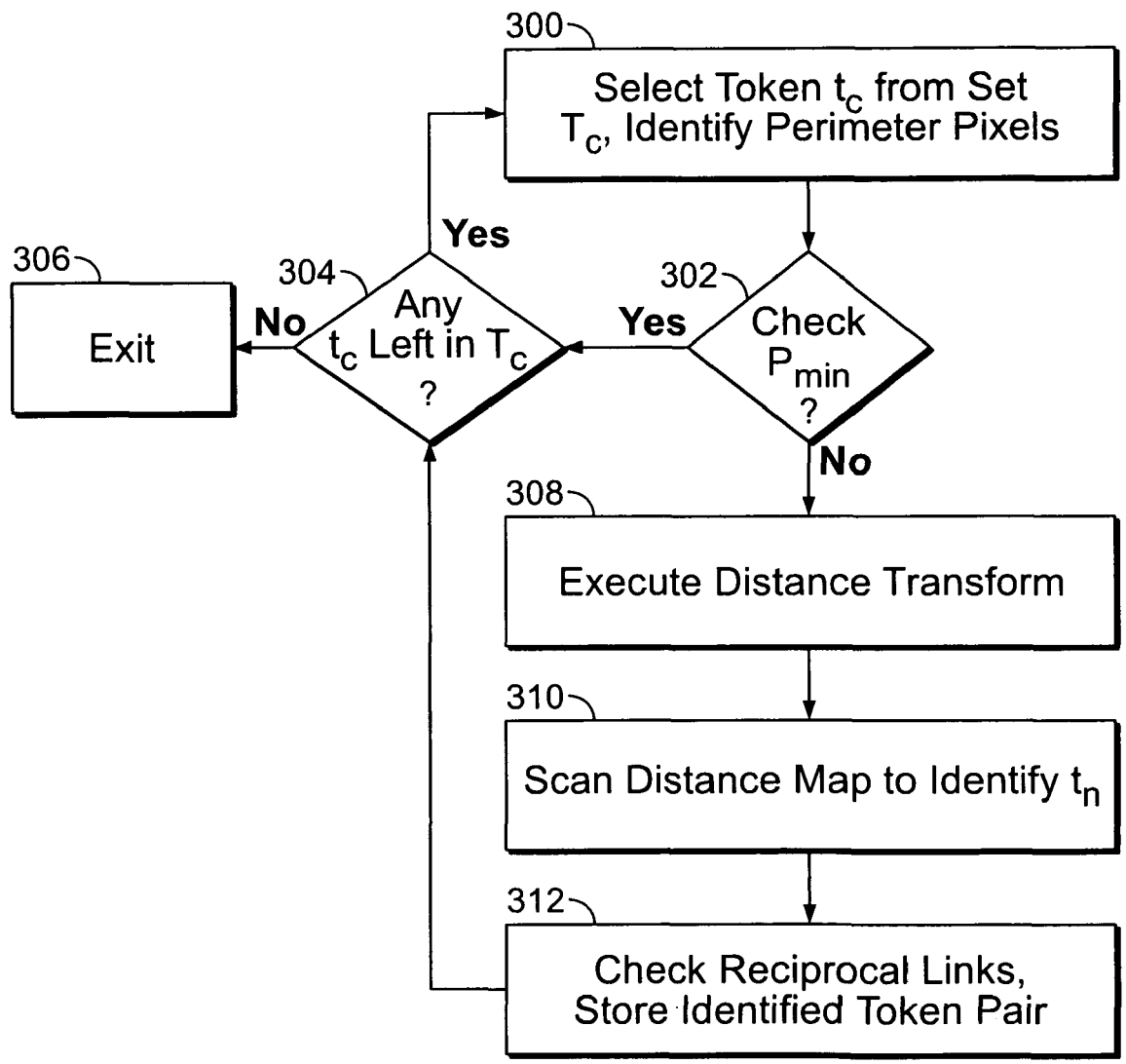
FIG. 9 is a flow chart for creating a token graph, containing token map information, according to a feature of the present invention.

A second exemplary technique according to the present invention, for using Type C tokens to create Type B tokens, is adjacent planar token merging. The adjacent planar token merging can be implemented when an image depicts areas of uniform color, that is for non-textured regions of an image. Initially, a token graph is used to identify tokens that are near to one another. FIG. 9 shows a flow chart for creating a token graph, containing token map information, according to a feature of the present invention. Each token $t_c$ in the set of Type C tokens $T_c$, generated through execution of the routines of FIGS. 6*a* and 7, is evaluated in terms of a maximum distance $D_{max}$ between tokens defining a neighboring pair of tokens, $t_c$, $t_n$, of the set $T_c$, a minimum number of token perimeter pixels, $P_{min}$, in each token of the neighboring pair of tokens, and a minimum fraction of perimeter pixels, $F_{min}$, of each token of a neighboring pair of tokens, required to be within $D_{max}$.

In step 300, the CPU 12 selects a Type C token $t_c$ in the set of Type C tokens $T_c$, and identifies the pixels of the selected token $t_c$ forming the perimeter of the token. In a decision block 302, the CPU 12 determines whether the number of perimeter pixels is less than $P_{min}$, for example 10 pixels.

If yes, the CPU 12 proceeds to decision block 304 to determine whether there are any remaining tokens $t_c$ in the set of Type C tokens $T_c$. If yes, the CPU 12 returns to step 300, if no, the CPU 12 exits the routine 306.

If no, the CPU 12 proceeds to step 308. In step 308, the CPU 12 generates a bounding box used as a mask to surround the selected token $t_c$. The bounding box is dimensioned to be at least $D_{max}$ larger than the selected token $t_c$ in all directions. A known distance transform (for example, as described in P. Felzenszwalb and D. Huttenlocher, Distance Transforms of Sampled Functions, Cornell Computing and Information Science Technical Report TR2004-1963, September 2004), is executed to find the distance from each perimeter pixel of the selected token $t_c$ to all the pixels in the surrounding bounding box. The output of the distance transform comprises two maps, each of the same size as the bounding box, a distance map and a closest pixel map. The distance map includes the Euclidean distance from each pixel of the bounding box to the nearest perimeter pixel of the selected token $t_c$. The closest pixel map identifies, for each pixel in the distance map, which perimeter pixel is the closest to it.

In step 310, the CPU 12 scans the distance map generated in step 308 to identify tokens corresponding to pixels of the bounding box (from the region map generated via the routine of FIG. 6a), to identify a token from among all tokens represented by pixels in the bounding box, that has a number $N_{cn}$ of pixels within the distance $D_{max}$, wherein $N_{cn}$ is greater than $P_{min}$, and greater than $F_{min}$*perimeter pixels of the respective token and the average distance between the respective token and $t_c$ is the lowest of the tokens corresponding to the pixels in the bounding box. If these conditions are satisfied, the respective token is designated $t_n$ of a possible token pair $t_c$, $t_n$, and a link $L_{cn}$ is marked active.

In step 312, the CPU 12 checks to determine whether a reciprocal link is also marked active, and when it is marked active, the CPU 12 marks and stores in the token graph, an indication that the token pair $t_c$, $t_n$ is a neighboring token pair. The reciprocal link refers to the link status in the evaluation of the token designated as $t_n$ in the current evaluation. If that token has yet to be evaluated, the pair is not designated as a neighboring token pair until the link $L_{cn}$ is verified as active in the subsequent evaluation of the token $t_n$. The CPU 12 then returns to decision block 304 to determine whether there are any further tokens in the set $T_c$.

Figure 10:
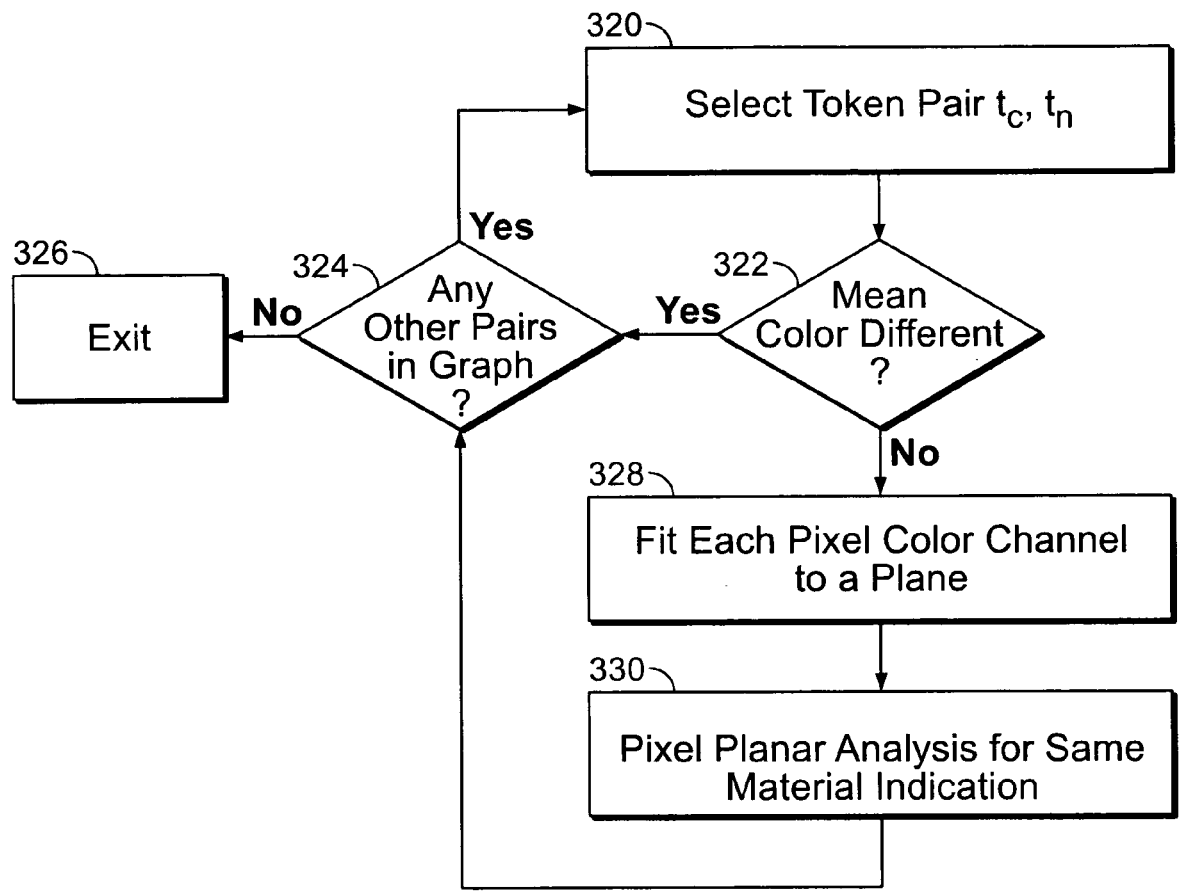
FIG. 10 is a flow chart for constructing Type B tokens via an adjacent planar token merging technique, according to a feature of the present invention.

Upon completion of the token graph, the CPU 12 utilizes token pair information stored in the graph in the execution of the routine of FIG. 10. FIG. 10 shows a flow chart for constructing Type B tokens via the adjacent planar token merging technique, according to a feature of the present invention. In the adjacent planer merging technique, pairs of tokens are examined to determine wether there is a smooth and coherent change in color values, in a two dimensional measure, between the tokens of the pair. The color change is examined in terms of a planar representation of each channel of the color, for example the RGB components of the pixels according to the exemplary embodiments of the present invention. A smooth change is defined as the condition when a set of planes (one plane per color component) is a good fit for the pixel values of two neighboring tokens. In summary, neighboring tokens are considered the same material and a Type B token when the color change in a two-dimensional sense is approximately planar.

In step 320, the CPU 12 selects a token pair $t_c$, $t_n$ from the token graph. In decision block 322, the CPU 12 determines whether the mean color in token $t_c$ is significantly different from the mean color in the token $t_c$. The difference can be a function of a z-score, a known statistical measurement (see, for example, Abdi, H. (2007), Z-scores, in N. J. Salkind (Ed.), Encyclopedia of Measurement and Statistics, Thousand Oaks, Calif.: Sage), for example, a z-score greater than 3.0.

If the mean colors of the token pair are different, the CPU 12 proceeds to decision block 324 to determine whether there are any additional token pairs in the token graph. If yes, the CPU 12 returns to step 320. If no, the CPU 12 exits the routine (step 326).

If the mean colors are within the z-score parameter, the CPU 12 proceeds to step 328. In step 328, the CPU 12 performs a mathematical operation such as, for example, a least median of squares regression (see, for example, Peter J. Rousseeuw, Least Median of Squares Regression, Journal of the American Statistical Association, Vol. 79, No. 388 (December, 1984), pp. 871-880) to fit a plane to each color channel of the pixels (in our example RGB) of the token pair $t_c$, $t_n$, as a function of row n and column m (see FIG. 2), the planes being defined by the equations:

$$R = X_{Rn} + Y_{Rm} + Z_R \ G = X_{Gn} Y_{Gm} + Z_G \ B = X_{Bn} + Y_{Bm} + Z_B$$

wherein parameter values X, Y and C are determined by the least median of squares regression operation of the CPU 12.

Upon completion of the plane fitting operation, the CPU 12 proceeds to step 330. In step 330, the CPU 12 examines each pixel of each of the tokens of the token pair $t_c$, $t_n$ to calculate the z-score between each pixel of the tokens and the planar fit expressed by the equation of the least median of squares regression operation. When at least a threshold percentage of the pixels of each token of the pair (for example, 80%), are within a maximum z-score (for example, 0.75), then the neighboring token pair is marked in the token graph as indicating the same material in the image. After completion of step 330, the CPU 12 returns to decision block 324.

Upon exiting the routine of FIG. 10, the CPU 12 examines the token graph for all token pairs indicating the same material. The CPU 12 can achieve the examination through performance of a known technique such as, for example, a union find algorithm. (See, for example, Zvi Galil and Giuseppe F. Italiano. Data structures and algorithms for disjoint set union problems, ACM Computing Surveys, Volume 23, Issue 3 (September 1991), pages 319-344). As a simple example, assume a set of seven Type C tokens $T_1$, $T_2$, $T_3$, $T_4$, $T_5$, $T_6$, $T_7$. Assume that the result of the execution of FIG. 9, (performance of the adjacent planar analysis), indicates that tokens $T_1$ and $T_2$ are marked as the same material, and tokens $T_1$ and $T_3$ are also marked as the same material. Moreover, the results further indicate that tokens $T_4$ and $T_5$ are marked as the same material, and tokens $T_5$ and $T_6$ are also marked as the same material. The result of execution of the union find algorithm would therefore indicate that tokens $\{T_1, T_2, T_3\}$ form a first group within the image consisting of a single material, tokens $\{T_4, T_5, T_6\}$ form a second group within the image consisting of a single material, and token $\{T_7\}$ forms a third group within the image consisting of a single material. The groups $\{T_1, T_2, T_3\}$, $\{T_4, T_5, T_6\}$ and $\{T_7\}$ form three Type B tokens.

Figure 11:
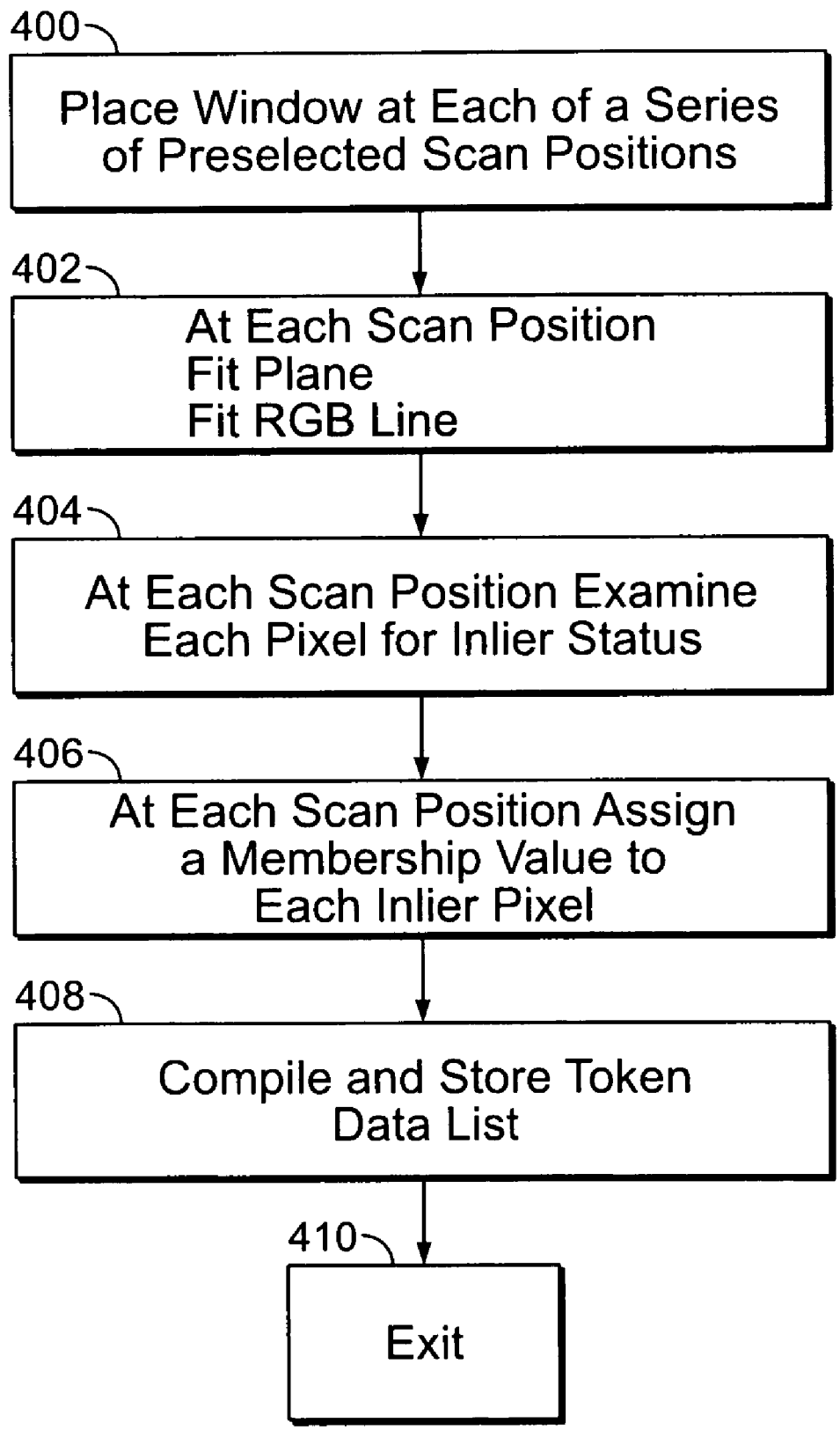
FIG. 11 is a flow chart for generating Type C tokens via a local token analysis technique, according to a feature of the present invention.

A third exemplary technique according to the present invention, for using Type C tokens to create Type B tokens, is a local token analysis. A local token approach generates Type C tokens using a window analysis of a scene depicted in an image file 18. Such tokens are designated as Type $C_w$ tokens. FIG. 11 is a flow chart for generating Type $C_w$ tokens via the local token analysis technique, according to a feature of the present invention.

In step 400, the CPU 12 places a window of fixed size, for example, a 33×33 pixel array mask, over a preselected series of scan positions over the image. The window can be a shape other than a square. The scan positions are offset from one another by a fixed amount, for example ½ window size, and are arranged, in total, to fully cover the image. The window area of pixels at each scan position generates a Type $C_w$ token, though not every pixel within the window at the respective scan position is in the Type $C_w$ token generated at the respective scan position.

At each scan position (step 402), the CPU 12 operates, as a function of the pixels within the window, to fit each of a set of planes, one corresponding to the intensity of each color channel (for example, RGB), and an RGB line in RGB space, characterized by a start point $I_0$ and an end point $I_1$ of the colors within the window. The planar fit provides a spatial representation of the pixel intensity within the window, and the line fit provides a spectral representation of the pixels within the window.

For the planar fit, the planes are defined by the equations:

$$R=X_{Rn}+Y_{Rm}+Z_R \ G=X_{Gn}Y_{Gm}+Z_G \ B=X_{Bn}+Y_{Bm}+Z_B$$

wherein parameter values X, Y and C are determined by CPU 12 by executing a mathematical operation such as the least median of squares regression discussed above, a least-squares estimator, such as singular value decomposition, or a robust estimator such as RANSAC (see, for example, M. A. Fischler, R. C. Bolles. Random Sample Consensus: A Paradigm for Model Fitting with Applications to Image Analysis and Automated Cartography. Comm. of the ACM, Vol 24, pp 381-395, 1981).

For the RGB line fit, the line is defined by:
$I(r,g,b)=I_0(r,g,b)+t(I_1(r,g,b)-I_0(r,g,b))$ wherein the parameter t has a value between 0 and 1, and can be determined by the CPU 12 utilizing any of the mathematical techniques used to find the planar fit.

At each scan position, after completion of step 402, the CPU 12 operates in step 404 to examine each pixel in the window in respect of each of the planar fit representation and RGB line representation corresponding to the respective window scan position. For each pixel, the CPU 12 determines an error factor for the pixel relative to each of the established planes and RGB line. The error factor is related to the absolute distance of the pixel to its projection on either from either the planar fit or the RGB line fit. The error factor can be a function of the noise present in the recording equipment or be a percentage of the maximum RGB value within the window, for example 1%. Any pixel distance within the error factor relative to either the spatial planar fit or the spectral line fit is labeled an inlier for the Type $C_w$ token being generated at the respective scan position. The CPU 12 also records for the Type $C_w$ token being generated at the respective scan position, a list of all inlier pixels.

At each scan position, after completion of step 404, the CPU 12 operates in step 406 to assign a membership value to each inlier pixel in the window. The membership value can be based upon the distance of the inlier pixel from either the planar fit or the RGB line fit. In one exemplary embodiment of the present invention, the membership value is the inverse of the distance used to determine inlier status for the pixel. In a second exemplary embodiment, a zero-centered Gaussian distribution with a standard deviation is executed to calculate membership values for the inlier pixels.

After all of the scan positions are processed to generate the Type $C_w$ tokens, one per scan position, the CPU 12 operates to compile and store a token data list (step 408). The token data list contains two lists. A first list lists all of the pixels in the image file 18, and for each pixel, an indication of each Type $C_w$ token to which it labeled as an inlier pixel, and the corresponding membership value. A second list lists all of the generated Type $C_w$ tokens, and for each token an indication of the inlier pixels of the respective token, and the corresponding membership value. After compiling and storing the token data list, the CPU 12 exits the routine (step 410).

Figure 12:
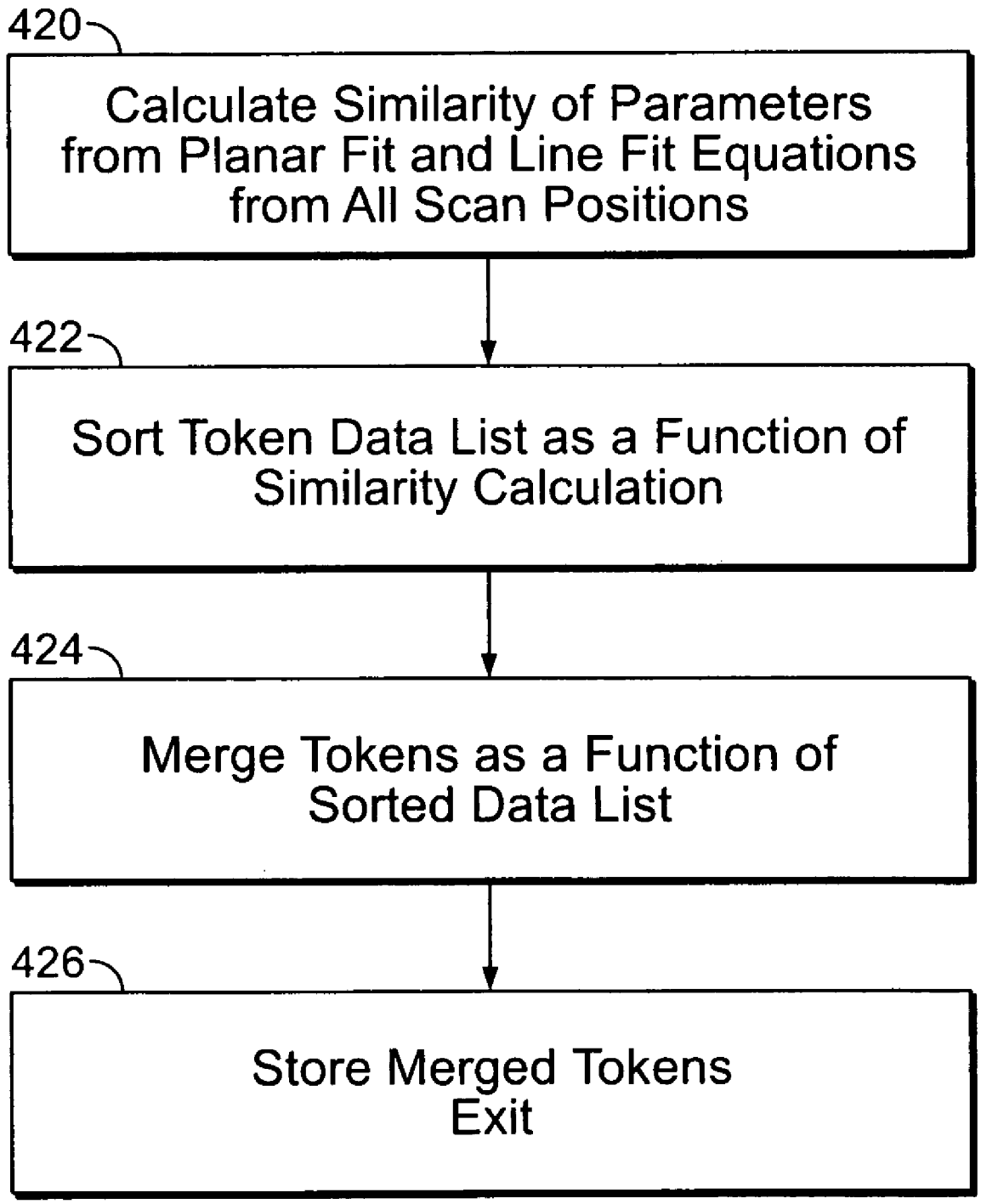
FIG. 12 is a flow chart for constructing Type B tokens from Type C tokens generated via the local token analysis technique of FIG. 11, according to a feature of the present invention.

FIG. 12 is a flow chart for constructing Type B tokens from the Type $C_w$ tokens generated via the local token analysis technique, according to a feature of the present invention. In step 420, the CPU 12 calculates a similarity of parameters of the spatial planer dimensions and spectral RGB lines of adjacent or overlapping Type $C_w$ tokens generated through execution of the routine of figure 108. Overlapping and adjacent Type $C_w$ tokens can be defined as tokens corresponding to scan positions that overlap or are contiguous. A similarity threshold can be set as a percentage of difference between each of the spatial planer dimensions and spectral RGB lines of two overlapping or adjacent Type $C_w$ tokens being compared. The percentage can be a function of the noise of, for example, the camera 14 used to record the scene of the image file 18. All overlapping or adjacent Type $C_w$ token pairs having a calculated similarity within the similarity threshold are placed on a list.

In step 422, the CPU 12 sorts the list of overlapping or adjacent Type $C_w$ token pairs having a calculated similarity within the similarity threshold, in the order of most similar to least similar pairs. In step 424, the CPU 12 merges similar token pairs, in the order of the sort, and labeling pairs as per degree of similarity. Each merged token pair will be considered a Type B token. In step 426, the CPU 12 stores the list of Type B tokens, and exits the routine.

Each of the arbitrary boundary removal, adjacent planar token merging, and local token analysis techniques involves an analysis of an input image file 18 (steps 1000 and 1002 of FIG. 3) by the CPU 12 to identify Type B tokens. Pursuant to a further feature of the present invention, a computer learning technique can also be implemented for execution by the CPU 12, during the performance of step 1002, for identification of illumination and material aspects of an image, as for example, same-material regions of an image depicted in an input image file 18. In this manner, advantage can be taken of advanced machine learning techniques, including the training of a computer to recognize features indicative of material and illumination characteristics in an image, to thereby enhance the accuracy of an image segregation operation.

An example of a computer learning technique includes the step of providing a training set, with the training set comprising a series of images selected from an image database. For each of the images of the training set, local image features are identified to provide representations of, for example, features of interest and relevant to material and illumination aspects of an image. The local image features can include spatio-spectral features that provide information that can be used to indicate a likelihood that regions of an image have a same intrinsic characteristic, such as, for example, that a pair of Type C tokens of an image file, are of the same material. Parameters based upon the features are arranged in feature vectors for analysis. In a learning technique, a classifier is built from the training set, for use in the learning technique, to classify regions of the image as having a same intrinsic characteristic. The parameters of the classifier are trained on feature vectors extracted from the training set. A classifier is a process or algorithm that takes feature vectors extracted from an input image file and outputs predictions or classifications regarding illumination and material aspects of an image depicted in the input image file. The classifier is applied in an analysis of feature vectors of a selected input image file 18, to, for example, identify regions, for example, selected pairs of Type C tokens of the subject image file 18, of a same material.

Figure 13:
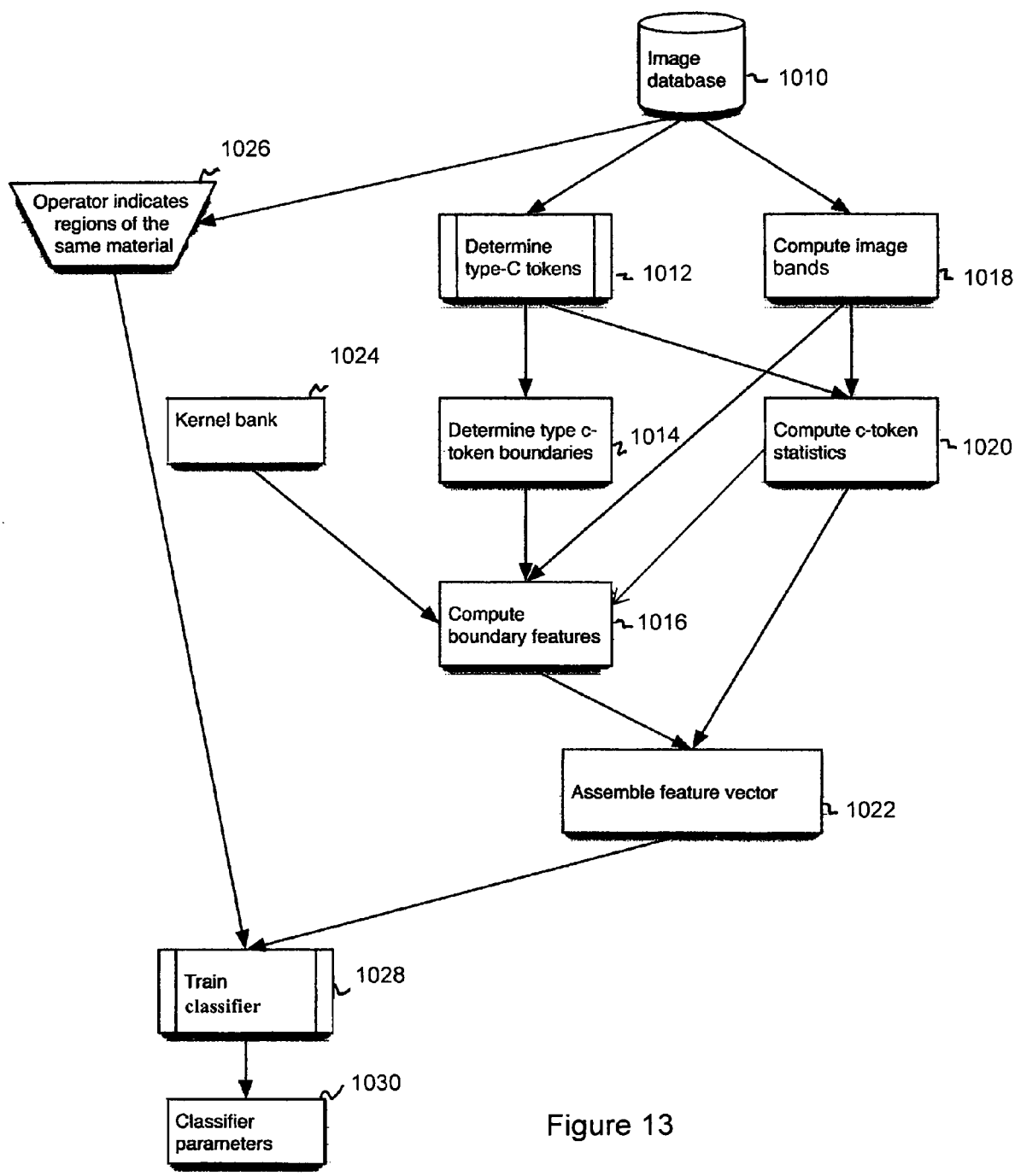
FIG. 13 is a flow chart for training a classifier, in connection with a computer learning technique for use in the identification of a same intrinsic characteristic of an image, such as same-material regions of an image, according to a feature of the present invention.

FIG. 13 is a flow chart for training a classifier, in connection with a computer learning technique for use in the identification of a same intrinsic characteristic such as, for example, same-material regions of an image, according to a feature of the present invention. In step 1010, an image database is provided. The image database contains, for example, one thousand image files depicting images of various items. The items depicted in the image files of the database can be everyday items such as supermarket products recorded against a flat plain grey background. The illumination conditions at the time of recording of the images are varied from uniform illumination, to illumination conditions that cause deep shadows with broad penumbrae, to shadows with sharp penumbrae.

Pursuant to an exemplary embodiment of the present invention, the image files of the image database are each input, in a sequence, one after the other, to the CPU 12, for processing (steps 1012-1016 and 1018-1020, to 1022, as will be described), to assemble a set of feature vectors for each image file of the database. The set of feature vectors comprises one feature vector per group under examination. In our example, each group includes a pair of Type C tokens to be examined to determine whether they are of the same material. A set of candidate token pairs can be selected for each image file, based upon, for example, proximity, brightness or any other image characteristics suitable to provide as representation of the image.

As noted above, each feature vector comprises image parameters, such as spatio-spectral features of each input image file from the database, that provide information that can be used to indicate features of interest, such as, for example, features relevant to a segregation of an image into material and illumination components of the image. In an exemplary embodiment of the present invention, the features of interest indicate a likelihood that regions of an image, such as, for example, a pair of Type C tokens of the image file being examined, are of the same material. The present invention contemplates features relevant to any intrinsic characteristic between regions of an image, such as a same material, or a same illumination, or any of the spatio-spectral operator/constraint arrangements described above. The parameters, in the exemplary embodiment of a same material between regions, include, for example:

absolute difference of average "color" within the regions being examined, per band;
local derivatives computed across a boundary shared by, for example, adjacent tokens being examined;
comparison of color line fits;
comparison of color plane fits;
Type B token features;
geometry features.

Pursuant to a feature of the present invention, in determining the absolute difference of average "color" within, for example, a pair of Type C tokens, multiple color spaces are used. For example, for an image file being examined, color differences are computed in terms of, for example, each of the color bands of linear RGB values of the pixels of the image, as stored in the image file 18, corresponding log RGB values for the pixels of the image file, HSV values (according to a known hue, saturation, brightness color space), log chromaticity values, as described above, values according to a known L, a, b color space and values computed via execution of a known tone mapping process.

Local derivatives taken along a boundary between adjacent tokens can be of any order, that is, first second and/or third order derivatives for pixels adjacent, and across from each other, along the boundary. The derivatives can also be taken relative to different color spaces, as described above in respect of the determination of absolute difference of color. Derivatives can also be taken across a virtual boundary. A virtual boundary is relative to two tokens that are not strictly adjacent, but have only blend tokens between them.

A blend token consists of pixels that straddle a distinct color change boundary. Each pixel of an image file is an average of the colors of a grid overlying a region of an image. When the grid overlies a boundary between two distinct colors, cells of the grid can include one or the other, or both colors of the boundary. Thus, the corresponding pixel will be an average of the two colors, appearing as a color that was not present in the original scene being recorded. Additionally, imperfections in lens design and manufacture, in image focus, and in the limits of resolution, can soften edges, resulting in the creation of blend pixels, such that a sharp boundary is recorded in the image as 2-3 blend pixels, for the change in the image to fully occur. The pixels of the blend tokens are each assigned to the token with the most similar color. The derivatives are then computed along the resulting new boundary.

A comparison of color line fits is implemented with the use of a robust fitting approach, such as, for example, RANSAC. An evaluation is made as to how close the RGB values of one token of the pair are to the line fit to the pixels of the other token. Thus, a line fit is computed for the RGB values of the first token of a pair of tokens, and then a calculation is made of the RMS distance between the pixels of the second token of the pair to the line of the first token, and vice versa.

A comparison of color plane fits is analogous to the color line fit feature. In this analysis, pixels of a second token are examined as to how well they fit color planes in each color band, of a first token, and vice versa. The planes are fit to (x, y, color band) in a token, with one plane per color band.

An analysis of Type B features involves the examination of same-material characteristics relevant to a Type B tokenization of an image, as described above in respect to the arbitrary boundary removal, adjacent planar token merging, and local token analysis techniques. A first Type B token feature is a simple binary indicator as to whether two tokens of a given pair are in a same Type B token, as identified via execution of a Type B tokenization of the image. A second feature relates to an RMS difference between the brightest (or darkest) part of the relevant B tokens to which each of the tokens of a token pair belong. This examination is useful to identify non-contiguous regions of an image that are of the same material.

For example, there is the case of one Type C token of a pair in Type B token 1, and the other Type C token of the pair in Type B token 2, with Tokens 1 and 2 being non-contiguous regions of the same material. If Token 1 spans a lit part and a shadowed part of the material and the one Type C token is within the shadowed part of Token 1 and Token 2 is fully lit, then the two Type C tokens of the pair will appear to be different since the two tokens are lit and shadowed versions of the same material. However, a comparison of the lit part of Token 1 with Token 2 provides a more meaningful comparison between the token pair, and thus serves as a distinguishing feature for the subsequent classifier.

An analysis of geometry features involve the computation of various comparisons of the geometric properties of a token pair. The comparisons include, for example, a comparison of the individual areas of the tokens of the pair, the ratio of the areas, a comparison of the individual perimeter lengths, the ratio of the perimeter lengths, and the fraction of the perimeter lengths that are shared between the pair of tokens. Binary features include an indication as to whether the two tokens of the pair are strictly adjacent, and an indication as to whether the two tokens are adjacent after a blend token removal, as described above.

Additional geometric features include features that capture spatial proximity. For example, a measure is made of the simple distance between the centroids of the tokens of the pair, and, further, a measure is made of the average distance between the boundary pixels of the token pair.

Referring once again to FIG. 13, in step 1012 the CPU 12 operates to identify Type C tokens in an image file from the image database, as for example, through execution of the routine of FIG. 6a, as described above. In step 1014, the CPU 12 performs an analysis of perimeter pixels of each Type C token identified in step 1012, to define the boundaries of each of the identified tokens. In step 1016, the information from steps 1012 and 1014 are input to a compute boundary features module, executed by the CPU 12 (step 1016), as will appear.

In a separate operation, executed in either parallel or serial operations, the CPU 12 (step 1018) computes image bands, that is, for the pixels of the image file, the CPU 12 computes log RGB values, HSV values, log chromaticity values, L, a, b color space values and values computed via execution of a known tone mapping process. The information from step 1018 is input to the compute boundary features module (for step 1016), and to step 1020.

In step 1020, the CPU 12 receives the color band information of step 1018, and the Type C token information from step 1012, and computes Type C token statistics, for use in the generation of the feature vector. The statistics can include, for example, line and plane fit parameters, token areas, mean and average colors, in each band, for each color space, for each token, color histograms, and all of the various parameters as are required to compute the features described above, as a function of the identified tokens and the color values for the pixels of the tokens. The CPU 12 can also identify Type B tokens via the arbitrary boundary removal, adjacent planar token merging, and local token analysis techniques. Information from step 1020 is input to the compute boundary features module of step 1016.

In step 1016, the CPU 12 executes the compute boundary features module to calculate the features described above, for each candidate pair of tokens, as a function of the information generated in steps 1012, 1014, 1018 and 1020. In addition, in step 1016, the CPU 12 optionally computes characteristics of pixels in the neighborhood of a boundary between adjacent tokens, for determination of similarity to a kernel from a predefined set of kernels. To that end, a kernel bank 1024 includes a set of samples, for example, 64 samples of illumination boundaries across a same material. The CPU 12 compares the sampled pixels from a tokens pair from an image file of the image database, under examination, to each of the samples of the kernel bank, and calculates a score as a function of any found similarities.

In step 1022, the CPU 12 concatenates the feature values from the execution of the compute boundary features module to define a feature vector for each selected token pair of an image file (step 1016). The CPU 12 performs the steps 1012-1022 for each image file in the image database, to generate a series of sets of feature vectors, one feature vector in the set for each of the selected token pairs of an image file, one set per image file, from the image files of the image database.

Pursuant to a further feature of the present invention, in step 1026, each image file of the image database is manually coded to indicate regions of a same intrinsic characteristic in the image depicted in the respective image file. In an exemplary embodiment of the present invention, the coding is a color coding wherein a human operator views each image file and in a touch screen, brush stroke operation, marks off each region of a same material, and controls the computer to assign a different arbitrary color to each marked region. Blend tokens can remain unclassified in the color coding. This provides a ground truth version of each image file used to train the classifier.

In step 1028, an operation is performed to use the feature vectors generated by the CPU 12, and the manually color coded ground truth image files, to train the computer and generate a classifier (output 1030). Any number of well known trainable classifiers provided by machine learning technology can be used to implement step 1028, such as, for example, decision trees, neural networks, support vector machines, boosted decision trees (such as Logitboost), and so on.

Figure 14:
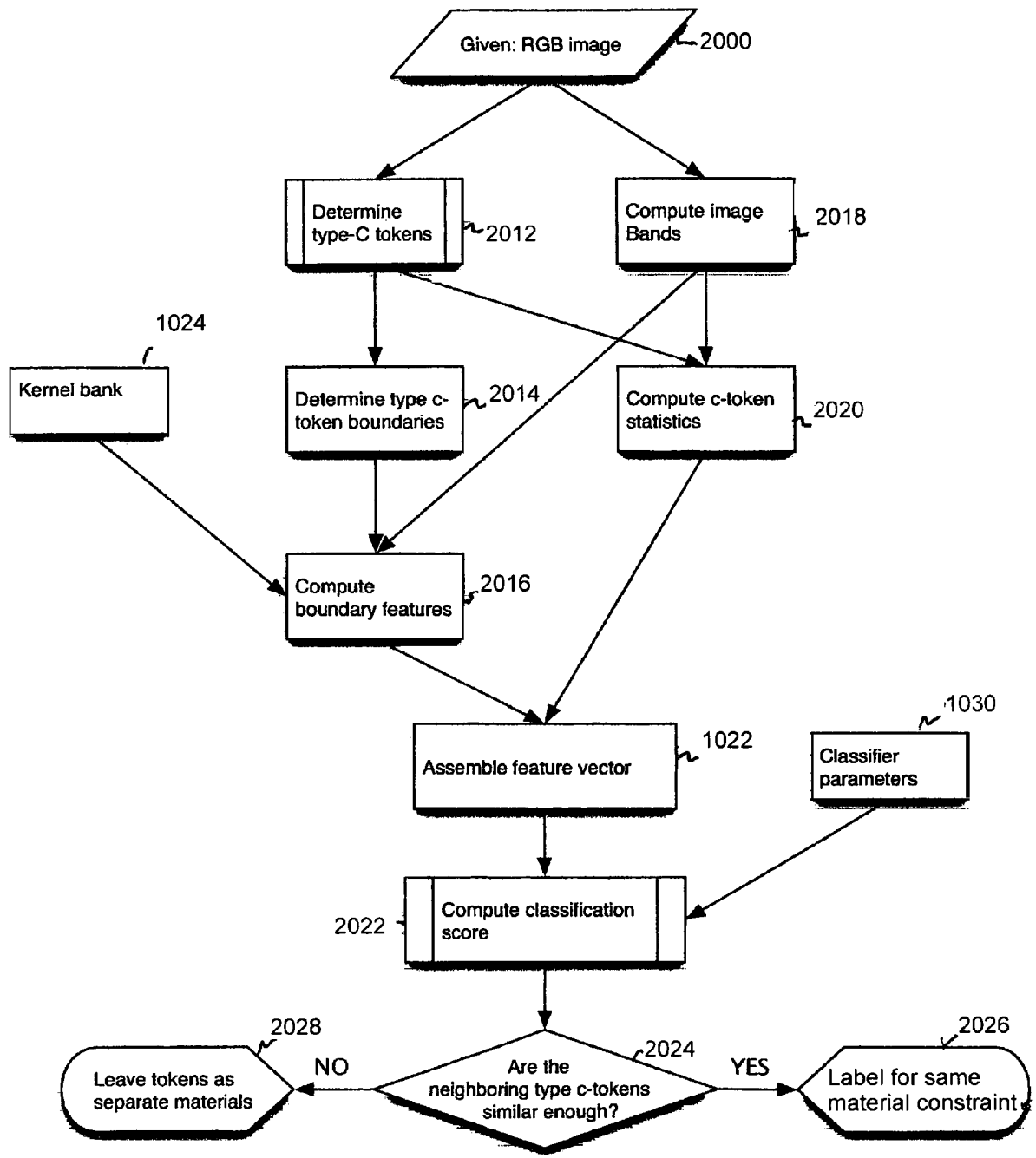
FIG. 14 is a flow chart for the use of the classifier, trained according to the flow chart of FIG. 13, to identify adjacent Type C tokens of the same-material, as a basis for identification of a same-material region of the image.

FIG. 14 is a flow chart for the use of the classifier trained according to the flow chart of FIG. 13 (classifier parameters 1030), to identify adjacent Type C tokens that are likely to be of the same material, as a basis for identifying same-material constraints. In step 2000 an image file 18 is input to the CPU 12 for identification of token pairs suitable for a same-material constraint. The CPU 12 executes steps 2012-2020 to perform the exact same functions in respect to the input image file 18 as were performed in steps 1012-1020 for the image files of the image database, to generate a feature vector for each one of the selected token pairs of the input image file 18.

In step 2022, the feature vectors for the input image file 18 are each processed by the trained classifier, for example, a Logitboost classifier or a Support Vector Machine (SVM) classifier, to compute a prediction or classification score for each token pair, as a function of the classifier parameters 1030, (as determined via execution by the CPU 12 of the routine of FIG. 13). The score can be in the range of from 0 to 1, a 0 corresponding to no likelihood that tokens of a selected token pair are of the same material and 1 corresponding to a high likelihood that the same-material characteristic is true. In step 2024, a threshold value can be selected, for example, 0.8, such that a score for a token pair classified by the trained classifier that is above the threshold (YES) results in the pair being treated as being of the same material (and thus candidates for a same-material constriant) (step 2026), and a score below the threshold (NO) results in the pair being treated as not being of the same material (step 2028).

According to a further feature of the present invention, a classifier can be trained to process token pairs that are not adjacent. Such a classifier will be based upon the features described above which do not relate to adjacency aspects of the token pair. This expands the capability of the computer learning technique to consider token groups that include both adjacent and non-adjacent token pairs, with each type of group being analyzed with an appropriate classifier.

In a further exemplary embodiment of the present invention, the CPU 12 (executing as the operators block 28) compiles lists of Type B tokens separately generated through each of and/or a combination of one or more of the arbitrary boundary removal, adjacent planar token merging, and local token analysis techniques. The determination of the combination of techniques used depends in part on whether a particular region of the image was filtered because of texturing of the image. Since each Type B token generated through the described techniques likely represents a single material under varying illumination conditions, merging sufficiently overlapping Type B tokens generated through the use of varying and different techniques, provides a resulting, merged Type B token that represents a more extensive area of the image comprising a single material, and approaches the extent of a Type A token.

Sufficiently overlapping can be defined by satisfaction of certain pixel characteristic criteria, such as, for example:

A) The two Type B tokens have at least n of the original Type C tokens in common, for example, n=1
B) The two Type B tokens have at least n pixels in common, for example, n=20
C) The two Type B tokens have at least n % overlap, that is at least n % of the pixels in a first one of the two Type B tokens are also found in the second one of the two Type B tokens or vice versa, wherein, for example n %=10%.
D) The percentage of pixels in a smaller one of the two Type B tokens, also found in the larger one of the two Type B tokens is above a preselected threshold, for example 15%.
E) A preselected combination of criteria A-D.

Merging of two sufficiently overlapping Type B tokens can be accomplished via a mathematical operation such as execution of the union find algorithm discussed above. In the case of two overlapping Type B tokens that do not satisfy the above discussed criteria, the overlapping pixels of the two tokens can be assigned to the larger one of the two Type B tokens.

As a result of execution by the Type C tokenization block 35 and/or the operators block 28 (via the CPU 12) of the token generation and merging techniques according to features of the present invention, an image can be accurately segmented into tokens representing discrete materials depicted in the scene (Type B tokens) and tokens representing regions of robust similar color (Type C tokens), thus providing a basis for computational efficiencies, as the token representations capture spatio-spectral information of a significant number of constituent pixels. The service provider 24 stores all of the Type C and Type B tokens generated through execution of the above described token generation techniques, along with the relevant token map information, for example, as determined during execution of the adjacent planar token merging technique, and cross-references the stored operator results to the associated selected image file 18, for use in any segregation processing of the selected image.

According to a feature of the present invention, the service provider 24 also stores all Type C token pairs that have been classified as a same material as a result of the execution of a computer learning technique, for example the Logitboost classification.

In a further exemplary embodiment of the present invention, Type C tokens for an input image file 18 are clustered relative to pairwise distances, and the Type C tokens of the resulting clusters are used as the basis for constraints such as, for example, same-material constraints. This is done to avoid chaining. Chaining occurs due to the fact that a classifier is sometimes incorrect in its operation.

For example, a classifier assigns a high score to a token pair, indicating a high probability that the tokens of the pair are of the same material, when in fact, the pair is not of the same material. For instance, when a classifier assigns a high score to each of token pairs (A, B), (B, C) and (C, D), and (B, C) is wrong, then A and C are not of the same material. If constraints are defined by all three relationships, an error will occur in the material image. Clustering can be used to help avoid this situation. For example, if the token pair B and D had a low score, then A and B would be in one cluster, and C and D in another, and, thus, a constraint based upon B and C would not be used since they would be in different clusters.

Figure 15:
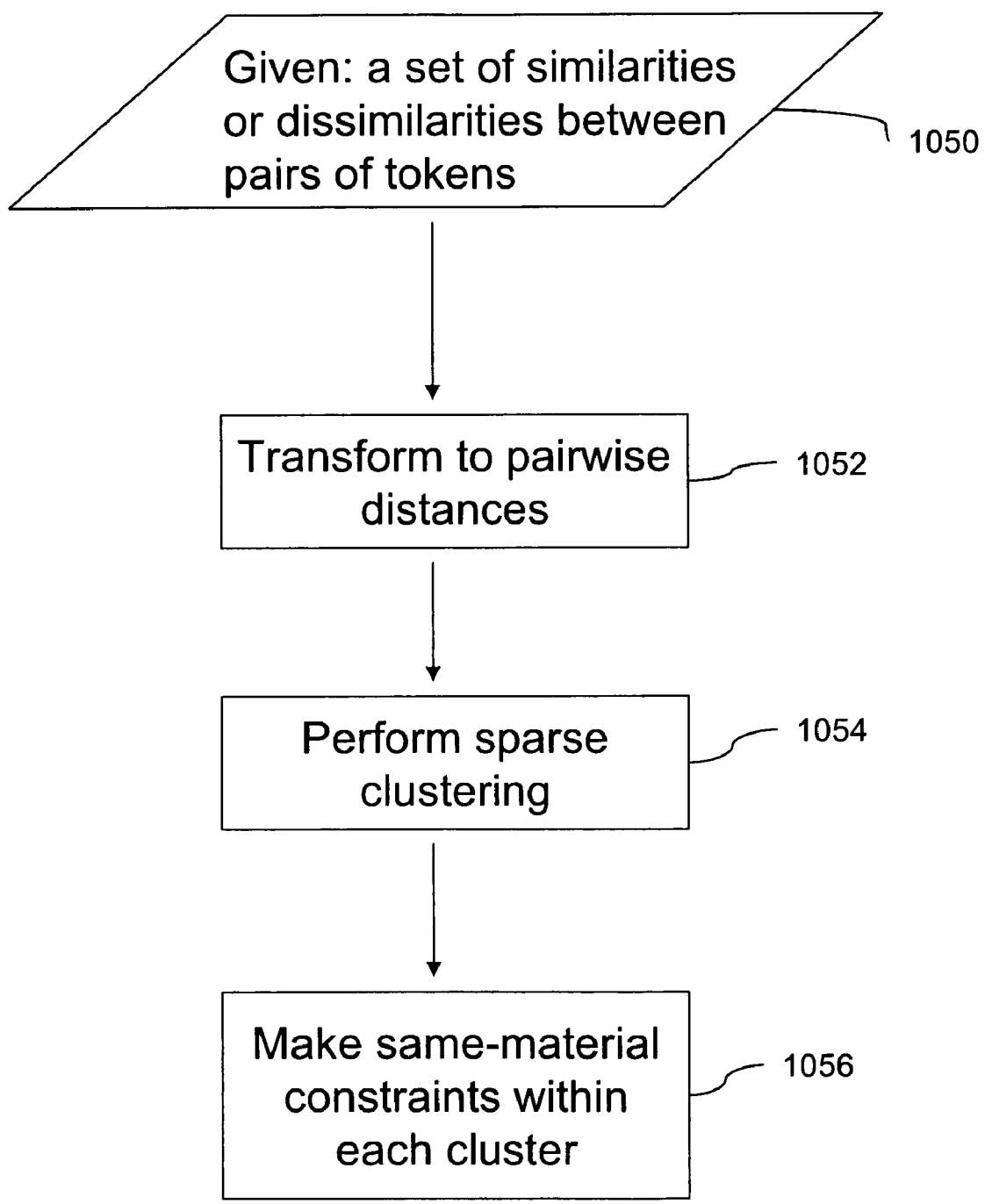
FIG. 15 is a flow chart for constructing a same-material constraint based upon sparse clustering, according to a feature of the present invention.

Referring now to FIG. 15, there is shown a flow chart for constructing a same-material constraint based upon sparse clustering, according to a feature of the present invention.

In step 1050, the CPU 12 is given a set of indicia measuring one of similarities and dissimilarities between selected pairs of Type C tokens. The token pairs selected for a sparse clustering include adjacent token pairs and some non-adjacent token pairs. A sparse sampling of token pairs can be selected according to several different selection criteria:

1. The CPU 12 is operated to select all adjacent pairs of tokens and a random subset of non-adjacent token pairs.
2. The CPU 12 is operated to select token pairs as a function of token seed size (the number of pixels used to build the token, see the description above). For example, each seed size is assigned a probability, such as a seed size of 5 or 6 pixels has a probability of 1.0, such that all pairs of tokens, each token of the pair built with a seed size of 5 or 6 pixels, are selected. For each token pair, the probability for selection for the sparse sampling equals the probability of the first token of the prospective token pair, times the probability of the second token of the prospective pair. A seed size of 4 is assigned a probability of 0.8, a seed size of 3, 0.6, a seed size of 2, 0.3, and a seed size of 1, a probability of 0.1.
3. The CPU 12 is operated to select all pairs of adjacent tokens, as a function of a probability based upon distance between tokens of a prospective pair of tokens. The probability can decrease according to a Gaussian profile.
4. The CPU 12 is operated to integrate the pair sampling into the clustering operation of step 1054 (as described below). For example, after clustering tokens of all adjacent pairs, then for all cluster pairs, some additional number of edges between tokens in one cluster and tokens in the other cluster of a pair are sampled. For example, log(n) edges are sampled where n is the number of tokens in the smaller cluster in a cluster pair.

For the indicia of one of similarities and dissimilarities, the classifier provides, for example, a score of between 0 and 1 for each pair of Type C tokens, via execution of the routine of FIG. 14. As noted above, in our example, a score of 0 corresponds to no likelihood that tokens of a selected token pair are of the same material and a score of 1 corresponds to a high likelihood that the same-material characteristic is true (an indicia of similarity). Token pairs with both high scores and low scores are processed in the clustering operation.

In step 1052, the CPU 12 transforms probabilities represented by the score information into pairwise distance measurements between token pairs. For example, distance=(1−probability) or distance=−log(probability). The pairwise connections expressed by the distance measurements are considered in terms of a graph structure. In the graph, each token is a node, and there is an edge between each selected pair of nodes. Each edge is assigned the distance for the token pair. A subset of all possible pairs is selected, as described above, to minimize the computational overhead for the computer system.

In step 1054, the CPU performs a clustering operation. The clustering involves the execution of an algorithm to find groups of nodes with short edges (i.e. a high probability or likelihood of being the same material). Each group should not contain any node pairs with a long edge (low probability). According to a feature of the present invention, a sparse clustering algorithm is used to cluster the nodes because of the sampling of a subset of all nodes, that is the selected pairs of tokens, as selected according to the criteria described above. In an exemplary embodiment of the present invention, the hierarchical clustering algorithm described in G. N. Lance and W. T. Williams "A General Theory of Classificatory Sorting Strategies: I. Hierarchical Systems" The Computer Journal 1967 9 (4) pages 373-380, is adapted to work on sparse pairwise distances, and implemented.

Any clustering algorithm that can be adapted to work on sparse pairwise distances can be implemented to cluster nodes with short edges into groups. For example, a simple modification to an hierarchical agglomerative clustering technique, such as the technique cited above, is an assumption that the properties of edges that are known are representative of the properties of all edges between two groups. Thus, a sparse hierarchical agglomerative clustering algorithm is stated as follows:

1. Sample and record distances between a subset of data point pairs.
2. Initialize each cluster to a single point.
3. Scan through the edge list, finding the smallest edge (shortest distance between two clusters).
4. Merge the two points connected by that edge and update the edge list. If clusters i and j are merged into cluster k, then update the distance to cluster h, as follows:
   (a) If there is no edge between j and h, then $d_{kh}=d_{ih}$.
   (b) If there is no edge between i and h, then $d_{kh}=d_{jh}$.
   (c) If there is an edge between i and h and between j and h, then set $d_{kh}$ as per:

$$d_{hk}=\alpha_i d_{hi}+\alpha_j d_{hj}+\beta d_{ij}+\gamma|d_{hi}-d_{hj}|$$

where the parameters $\alpha_i$, $\alpha_j$, $\beta$ and $\gamma$ can be set according to several criteria, such as:

i. Minimum Link: where $\alpha_i=\alpha_j=0.5$, $\beta=0$ and $\gamma=-0.5$

In this mode, the distance between the third cluster h and the newly formed cluster k is at the minimum of the distance between h and the original clusters i and j: $d_{hk}=0.5*d_{hi}+0.5*d_{hj}-0.5*|d_{hi}-d_{hj}|$ ii. Average Link: where $\alpha_i=n_i/(n_i+n_j)$, $\alpha_j=n_j/(n_i+n_j)$, $\beta=0$ and $\gamma=0$ In this mode, the distance between h and k is the weighted average of the distance between h and i and between h and j. The weighting is provided by the number of points in each cluster, n, and indicates that the distance between h and k is the average between points in h and points in k.

iii. Centroid: where $\alpha_i=n_i/(n_i+n_j)$, $\alpha_j=n_j/(n_i+n_j)$, $\beta=-\alpha_i*\alpha_j$ and $\gamma=0$ In this mode, when merging clusters i and j to form cluster k, k is considered to be at the centroid of i and j, provided the pairwise distance matrix represents squared Euclidean distance. That is, if $x_i$ is the centroid of cluster i, then: $x_k=(n_i x_i+n_j x_j)/(n_i+n_j)$. The squared distance between cluster h and cluster k is: $d_{hk}=[x_h-(n_i x_i+n_j x_j)/(n_i+n_j)]^2$ by multiplying terms, and rearranging:

$$d_{hk} = n_i/n_k * (x_h - x_i)^2 + n_j/n_k * (x_h - x_j)^2 - n_i n_j/n_k n_k * (x_h - x_j)^2$$

$$= n_i/n_k * d_{hi} + n_j/n_k * d_{hj} - n_i n_j/n_k n_k * d_{ij}$$

which illustrates where the specified values of $\alpha_i$, $\alpha_j$, $\beta$ and $\gamma$ come from.

iv. Median: where $\alpha_i=\alpha_j=0.5$, $\beta=-0.25$ and $\gamma=0$

This is similar to the centroid mode, but pretends the two cluster sizes are equal. In the case of squared Euclidean distance, this indicates that the apparent location of new cluster k is halfway between i and j, even if one cluster has many more points than the other. The term "median" is used because the new distance vector form h to k lies along the median of the triangle from h to j to i v. Flexible: where $\alpha_i=\alpha_j=0.625$, $\beta=-0.25$ and $\gamma=0$ In this mode every distance update rule affects the space of the data points. Some modes, like min link, contract the space: when creating a new group that new group now appears closer to some or all of the other existing groups. This is what can lead to undesirable chaining. During clustering, space contracting methods tend to have single points joining existing large clusters rather than starting new clusters with other singletons. Other modes dilate the space: on formation a cluster is now further from other groups than it used to be. In this mode, single points tend to join other single points to create new clusters, and will often cluster together outliers even though the points may be very different. Both centroid and average link are space conversing, neither dilating nor contracting space. The flexible mode is defined by setting $\alpha_i+\alpha_j+\beta=1$, $\alpha_i=\alpha_j$ $\beta<1$ and $\gamma=0$. As $\beta$ is varied from near 1 to −1, the clustering behavior moves from strongly space-contracting to strongly space-dilating. At $\beta=-0.25$, the clustering is slightly dilating.

5. Repeat step 3 until there are no more remaining merges below a threshold level or until a preselected number of clusters is reached.

In step 1056, the CPU 12 defines same-material constraints based upon the identified clusters of tokens. For example, each pair of tokens in a cluster can be the basis of a same material constraint, or a star node or Steiner node constraint can be defined relative to each token of a cluster, and a new variable.

Figure 16:
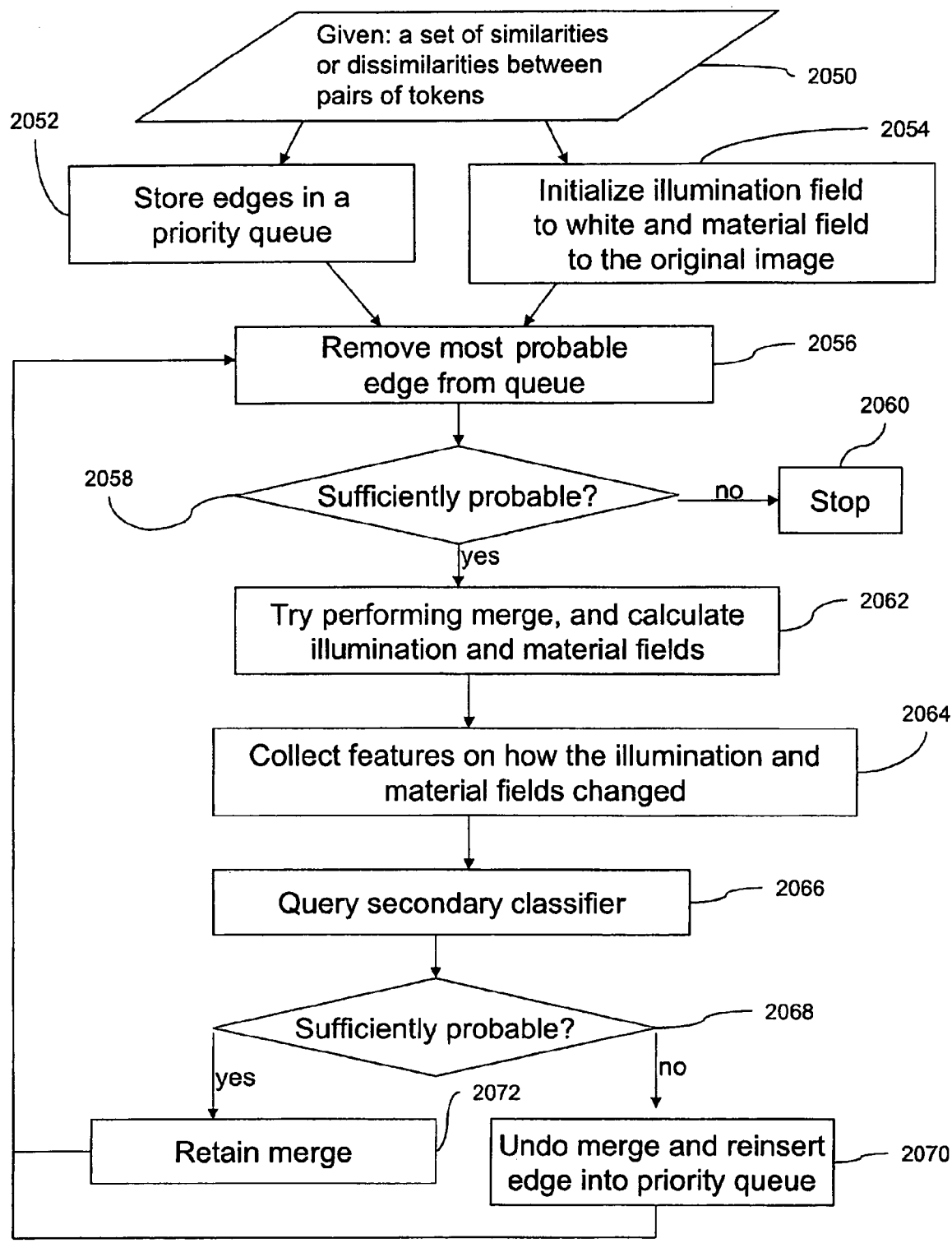
FIG. 16 is a flow chart for a further method of clustering same-material regions of an image, according to a feature of the present invention.

FIG. 16 is a flow chart for a further method for clustering same-material regions of an image, according to a feature of the present invention. In step 2050, the CPU 12 is given a set of indicia of one of similarities and dissimilarities between selected pairs of Type C tokens, as in the routine of FIG. 15. Steps 2052 and 2054 are performed separately, either in parallel or serially. In step 2052, the CPU 12 stores all of the indicia, in terms of scores determined by the classifier through execution of the routine of FIG. 14, for all the token pair edges, in a priority queue. In step 2054, the CPU 12 initializes an illumination field, for an illumination image, to white, and a material field, for a material image to the image depicted in an input image file 18.

In step 2056, the CPU 12 removes the edge from the priority queue, for the token pair with the highest score. In step 2058, the CPU 12 decides if the edge with the highest score is sufficiently high to continue the execution of the routine of FIG. 16. For example, a threshold may be set for a score. If the edge with the highest score is not higher than the threshold value, the routine is stopped (step 2060). If the score exceeds the threshold, the CPU 12 continues on to step 2062. The threshold can be set at, for example, 0.8.

In step 2062, the token pair with the highest score is merged as a single material, and the CPU 12 operates to generate illumination and material images, as described in the present detailed description.

In step 2064, the CPU 12 assembles statistics regarding the quality of the material and illumination images generated with the assumption that a current token pair with a highest score is a same material match. The statistics can include, for example, information on features such as the variety of colors in the illumination map, the prevalence and strength of concurrent boundaries in the material and illumination images, the smoothness of the illumination image and the piecewise uniformity in the material image.

A secondary classifier is trained, for example, as in the routine of FIG. 13, with the features set forth above, such as absolute difference of average "color" within the regions being examined, per band; local derivatives computed across a boundary shared by, for example, adjacent tokens being examined; comparison of color line fits; comparison of color plane fits; Type B token features; and geometry features, as well as the features of the variety of colors in the illumination map, the prevalence and strength of concurrent boundaries in the material and illumination images, the smoothness of the illumination image and the piecewise uniformity in the material image.

In step 2066, the secondary classifier is applied to classify the current token pair with the highest score, for example, as per the routine of FIG. 14, to classify the probability that the tokens of the current token pair are of the same material.

In step 2068, the CPU 12 determine whether the probability is sufficiently high to assume that the tokens of the current pair are of the same material. Again, the decision can be based upon a threshold value for a probability score, for example, 0.8. If no, the CPU 12 proceeds to step 2070 to undo the merge, restate the probability score for the token pair, and return the token pair to the queue, and step 2056. If yes, the CPU 12 proceeds to step 2072 to retain the merge, and return to step 2056.

Thus, the routine of FIG. 16 is an iterative process to parse through each pair of tokens to determine same material pairs. Pursuant to a further feature of the present invention, a plurality of secondary classifiers is provided. For example, one classifier trained to early-stage merges, that is used when the first few token pairs are evaluated. A mid-stage classifier, that is used after several merges have been retained. And a late-stage classifier, that is used during evaluation of the last few token pairs.

In our example of a same illumination constraint, the service provider 24 identifies Type C and Type B tokens as the operators required by the selected constraint. The Type C tokenization block 35 generated the Type C tokens. The service provider 24 operates the operators block 28 to execute the above described techniques, to generate the relevant Type B tokens for the image 32, as well as a token map. The constraint builder 26 organizes the generated token operators according to the exemplary matrix equation, [A][x]=[b], for input to the solver 30. In the same illumination constraint, the constraining relationship of the relevant constraint generator software module is that adjacent Type C tokens, as indicated by the token map information, are lit by the same illumination, unless the adjacent Type C tokens are part of the same Type B token.

Each Type C token stored by the service provider 24 is identified by a region ID, and includes a listing of each constituent pixel by row and column number. Each pixel of a Type C token will be of approximately the same color value, for example, in terms of RGB values, as all the other constituent pixels of the same Type C token, within the noise level of the equipment used to record the image. An average of the color values for the constituent pixels of each particular Type C token can be used to represent the color value for the respective Type C token. Each Type B token is identified by constituent Type C tokens, and thus can be processed to identify all of its constituent pixels via the respective constituent Type C tokens.

Pursuant to a feature of the present invention, a model for image formation reflects the basic concept of an image as comprising two components, material and illumination. This relationship can be expressed as: I=ML, where I is the image color, as recorded and stored in the respective image file 18, M the material component of the recorded image color and L the illumination component of the recorded image color. The I value for each Type C token is therefore the average color value for the recorded color values of the constituent pixels of the token.

Thus: $\log(I) = \log(ML) = \log(M) + \log(L)$. This can be restated as $I = m + l$, where I represents $\log(I)$, m represents $\log(M)$ and l represents $\log(L)$. In the constraining relationship of the same illumination constraint, in an example where three Type C tokens, a, b and c, (see FIG. 17) are adjacent (and not within the same Type B token, (as can be shown by a comparison of row and column numbers for all constituent pixels)), $l_a = l_b = l_c$. Since: $l_a = i_a - m_a$, $l_b = i_b - m_b$, and $l_a = i_c - m_c$ these mathematical relationships can be expressed as $(1)m_a + (-1)m_b + (0)m_c = (i_a - i_b)$, $(1)m_a + (0)m_b + (-1)m_c = (i_a - i_c)$ and $(0)m_a + (1)m_b + (-1)m_c = (i_b - i_c)$.

Figure 17:
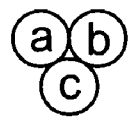
FIG. 17 is a representation of an [A][x]=[b] matrix relationship according to a feature of the present invention.

FIG. 17 shows a representation of an [A][x]=[b] matrix equation for the mathematical relationships of the example of the three adjacent Type C tokens a, b and c described above, as constrained by the same illumination constraint: the adjacent Type C tokens a, b and c are at the same illumination. In the matrix equation of FIG. 17, the various values for the $\log(I)$, in the [b] matrix, are known from the average recorded pixel color values for the constituent pixels of the adjacent Type C tokens a, b and c, generated by the Type C tokenization block 35 from the image selected for segregation. The [A] matrix of 0's, 1's and -1's, is defined by the set of equations expressing the selected same illumination constraint, as described above. The number of rows in the [A] matrix, from top to bottom, corresponds to the number of actual constraints imposed on the tokens, in this case three, the same illumination between three adjacent Type C tokens. The number of columns in the [A] matrix, from left to right, corresponds to the number of unknowns to be solved for, again, in this case, three. Therefore, the values for the material components of each Type C token a, b and c, in the [x] matrix, can be solved for in the matrix equation. It should be noted that each value is actually a vector of three values corresponding to the RGB color bands of our example.

Accordingly, the matrix equation of FIG. 17, as arranged by the constraint builder 26, is input by the constraint builder 26 to the solver 30 for an optimized solution for the values of the material components of the adjacent Type C tokens a, b and c of the selected image. As noted above, in the exemplary GUI embodiment of the present invention, a user selects one of several mathematical techniques for finding the optimal solution to the system of constraint equations, [A][x]=[b]. The CPU 12 configures the solver 30 according to the mathematical operation selected by the user.

For example, in a standard least squares solver, the matrix equation is restated as $\underset{x}{\min}(Ax-b)^2$. The solver 30 then executes the least squares operation to determine optimized values for each of $m_a$, $m_b$ and $m_c$. The solver 30 can then proceed to generate and display a material image based upon the optimal $m_a$, $m_b$ and $m_c$ values. In the material image, the $m_a$, $m_b$ and $m_c$ values are substituted for the originally recorded RGB values, for each pixel of the respective tokens. The solver 30 can proceed to also generate an illumination image from the known recorded image values $i_a$, $i_b$, $i_c$, and the determined $m_a$, $m_b$ and $m_c$ values, utilizing the model expressed by $i = m + l$. Each of the material and illumination images (the intrinsic images) are displayed on the monitor 20, via, for example, the GUI (see FIG. 5) and can be stored by the service provider 24, and cross-referenced to the original image file 18.

Referring once again to FIG. 3, step 1004 represents the storing of the intrinsic images in the memory 16 of the computer system 10. Pursuant to a further feature of the present invention, the CPU 12 operates (step 1006) to utilize the intrinsic images in a further processing of the intrinsic images. For example, the CPU 12 can process one or more of the intrinsic images in the performance of tasks such as object recognition or optical character recognition, color manipulation, editing, intensity adjustment, shadow removal or adjustment, adjustment of geometry, or other illumination and/or material manipulation, and so on, and/or compilation of information related to the image, and or objects depicted in the image.

According to a further feature of the present invention, the solver 30 can be configured to introduce factors including bounds that capture the limits of real world illumination and material phenomena, to keep material/illumination values determined by the optimization procedures as solutions, [x], to within physically plausible ranges. This can be implemented, for example, in an iterative technique to introduce additional inequality constraints on out-of-bounds values in [x], at each iteration, and executed to resolve towards values within the defined bounds. Thus, the above described least squares technique can be augmented to include minimum and maximum bounds on individual material estimates (as expressed by the entries of [x]). Moreover, the entries of [x] can be regularized such that the material estimates are consistent with a priori knowledge of material properties.

In an exemplary embodiment of the present invention, the matrices used in the least squares solver to specify the selected constraints, [A] and [b] are subject to the following bounds, expressed by the problem:

a linear least squares formulation: $\min_{x'} \Sigma_i (A_i^T x' - t_i)^2$
subject to: $x' \geq \alpha_m 1$
$x' \leq \omega_m 1$
$x' \geq img_j$ where 1 denotes the vector of all ones, $\alpha_m$, the darkest possible material value (for example, a material cannot be darker than coal), and $\omega_m$, the brightest possible material value. The $img_j$ value is the log intensity value at a particular token j, to provide a constraint based upon the real world observation that a segregated material color cannot be darker than it appeared in the original image, since illumination can only brighten the apparent color of an observed material.

In the linear least squares formulation, the unique minimum solution for x' is the material map that minimizes, in a linear system expressed by $A^T A x' = A^T t$, the average squared difference between the target material differences t, and the estimated differences $A_i^T x'$. For example, if the "ith" constraint $A_i$ dictates that two tokens a & b are the same material, $A^T A x'$ takes the difference between the values of tokens a & b in x' and computes the distortion from the target value $t_i = 0$.

The inequalities expressed by the "subject to" bounds set forth above, form a feasible set of material solutions x' which satisfy the real world constraints of possible maximum and minimum material color values. This differs from the standard, known least squares solution in that x', if not further constraint by the "subject to" bounds, could take on a value at a given location of an image (for example, at a particular pixel or token) that violates the real world observations of reflectance, yet achieves a more optimal solution for the min x' formulation.

In the optimization process executed by the solver 30, whenever any tokens have material color values that violate the "subject to" inequalities, at a particular iteration of the process, additional temporary constraints are added that pin the material values in violation, to values that satisfy the bounding conditions. Thus, the original matrices [A] and [b] are augmented with new matrices specifying the new bounding constraints $A_{bounds}$ and $b_{bounds}$ (as an expression of the "subject to" bounds) to define a new augmented system of matrix equations $[A; A_{bounds}][x][b, b_{bounds}]$. The augmented system of equations can be solved analogously to the original system, for example, using the known least squares procedure.

In accordance with the above described bounded feature of the present invention, additional, temporary constraints are added whenever color values violate real world phenomena. A re-solving of the augmented equations can be repeated, as necessary, starting with the original system $A^T A x' = A^T t$, each time (i.e. the temporary bounding constraints need not be carried over between iterations), and iteratively solving augmented systems $A'^T A' x' = A'^T t'$ until the "subject to" bounds are satisfied.

In accordance with yet another feature of the present invention, an $L_1, L_\infty$ objective function provides a regularization of the optimized solution by encoding a preference for a small number of material changes. In effect, the $L_1, L_\infty$ solver includes the a priori belief that material maps should contain a small number of materials in a figure-of-merit. In the solver of the system, there is a distinction between the objective function, a formula that assigns a figure-of-merit to every possible solution, and the algorithm used to find a solution, an optimal value according to a given objective function. As the problem in our exemplary embodiment is stated as a minimization, $\min_{x'} \Sigma_i (A_i^T x' - t_i)^2$, the value an objective function assigns can be characterized as a "cost."

In our problem, let x' be a matrix of a number of rows of tokens and a number of columns of color bands, where $x'^c$ denotes the $c^{th}$ column associated with the $c^{th}$ color band. The least squares objective function, in formula, is augmented, as follows:

$$\min_{x'} \Sigma_c \Sigma_i (A_i^T x^c - t^c i)^2 + \gamma \Sigma_{k|tk} \max_c |A_k^T x^c|$$

where $\gamma | \gamma > 0$ governs the trade-off between the cost associated with the least squares term and the $L_1, L_\infty$ penalty. The expression $\Sigma_{k|tk} \max_c |A_k^T x^{tc}|$ accumulates the maximum per-channel absolute difference over all the same material constraints in [A].

For example, given a same-material constraint between tokens a & b, the $L_1, L_\infty$ function will only include a term for a color channel with the largest difference in between $x^c_a$ and $x^c_b$ over color channel c. In an exemplary embodiment of the present invention, the optimization procedure, for example as expressed by the objective function $\min_{x'} \Sigma_c \Sigma_i (A_i^T x^{tc} - t^c i)^2 + \gamma \Sigma_{k|tk} \max_c |A_k^T x^{tc}|$, is a shrinkage technique. That is, a sequence of least squares problems is solved in a manner wherein, at each round, constraint targets determined to violate the same-material constraint are shrunk. At the end of the sequence, constraints with a value below a given threshold are culled from the constraint system, and a new least squares solution is computed. It should be noted that bounds such as the "subject to" bounds discussed above, can be added to the objective function to provide a bounded $L_1, L_\infty$ solver.

Figure 18:
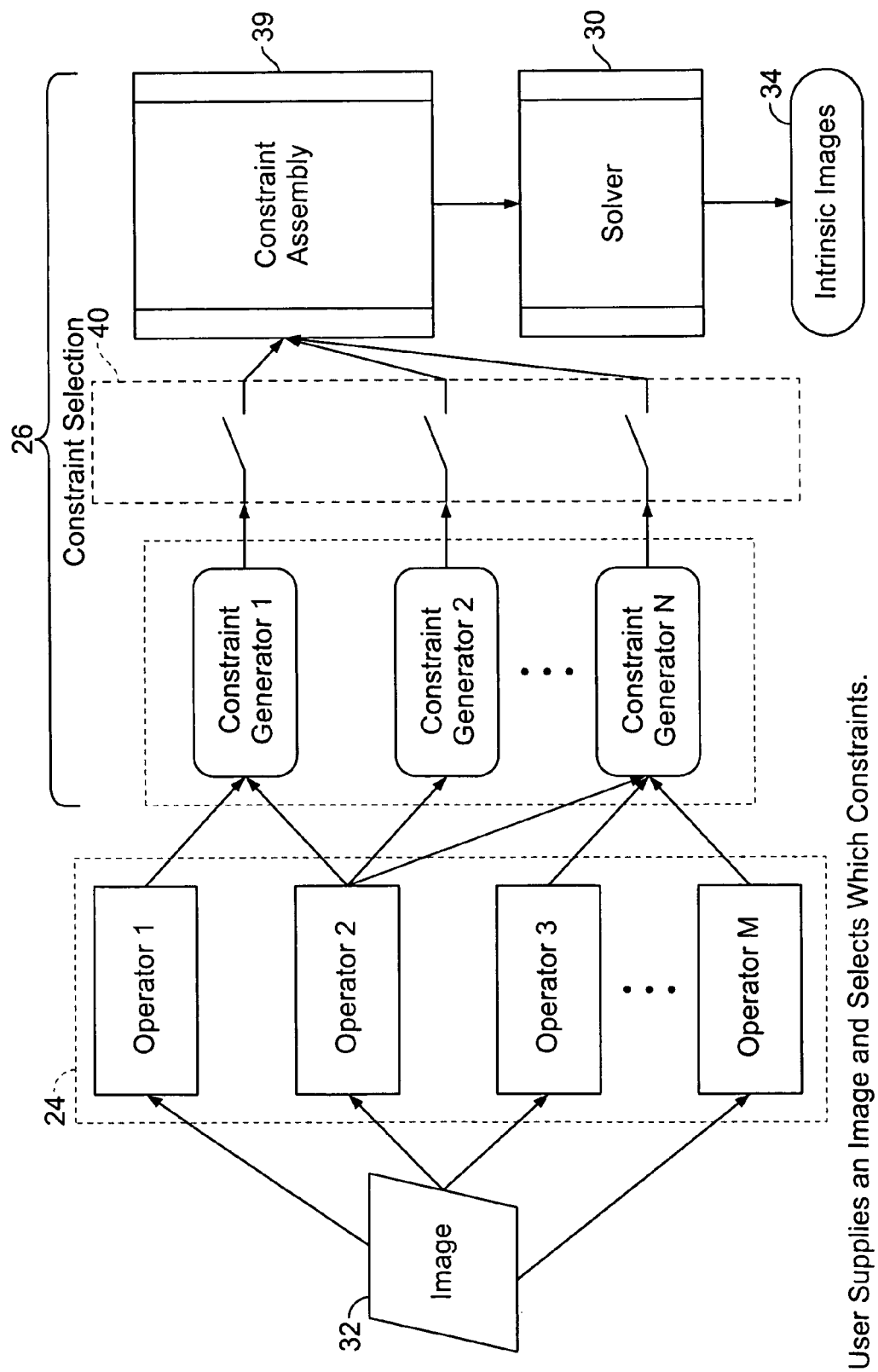
FIG. 18 is a functional block diagram for a service provider component for use in the image segregation system architecture of FIG. 4.

FIG. 18 is a generalized functional block diagram for the service provider 24 and constraint builder 26. To summarize the above described constraint examples in a general scheme, a selection is made of an image 32, and a number of constraint generators from a set of constraint generators 1, 2, . . . N, (the constraint generator software modules) for example, by a user, via the GUI. The set of constraint generators 1-N includes the constraints described above, and any additional constraining relationships developed as a function of spatio-spectral information for an image. A constraint can also include same-material constraints based upon Type C tokens found to have a high likelihood of being of the same material through execution of the computer learning technique described above, or any tokens within a cluster, as described above. The above described set of constraints is provided as an example. The present invention contemplates any constraining relationship based upon spatio-spectral operators, that provides a logical deduction regarding material and illumination aspects of an image, and thus a basis for constructing matrices [A] and [b] to define a set of equations whose optimal solution captures intrinsic illumination and material components of a given image.

Likewise, a set of operators 1-M, generated by the Type C tokenization block 35 or the operators block 28, includes all operators defined in the constraint generator modules 1-N. As shown in FIG. 18, the service provider 24 provides all of the operators 1-M, as required by the selected constraint generators 1-N and further couples the selected constraint generators 1-N to a constraint assembly 39 via a logical switch 40 (both configured within the constraint builder 26). In the event any of the operators 1-M for a selected image 32 are not already stored by the service provider 24, the service provider 24 utilizes the operators block 28 to compute such operators on demand, in the manner described above. The constraint assembly 39 constructs a separate [A][x]=[b] matrix for each one of the selected constraint generators, as a function of the operators and the constraining relationships defined in the respective constraint generators 1-N. In each case, the [A][x]=[b] matrix is constructed in a similar manner as described above for the same illumination example.

Upon completion of the construction of the system of equations $[A]_i[x]=[b]_i$, for each of the selected constraint generators, $i=\{1, 2, \ldots N\}$, the constraint assembly 39 concatenates the constituent matrices $[A]_i$, $[b]_i$, from each constraint generator. Since each of the concatenated equations may contain a different subset of the unknowns, [x], the assembly is performed such that corresponding columns of individual matrices $[A]_i$, that constrain particular unknowns in [x], are aligned. The concatenated matrices, [A][x]=[b], are then input to the solver 30, for solution of the unknowns in the complete [x] vector, pursuant to the selected optimization procedure, for output of intrinsic images 34. The individual constraints within the concatenated matrices, [A][x]=[b], can be weighted relative to one another as a function of factors such as perceived importance of the respective constraint, strength or empirically determined confidence level.

The above described example of a same illumination constraint utilizes Type C token and Type B token spatio-spectral operators. These token operators provide an excellent representation of images that include large surface areas of a single material, such as are often depicted in images including manmade objects. However, in many natural scenes there are often large areas of highly textured regions, such as sand, grass, stones, foliage, and so on. As noted above, identification of Type B tokens using Type C tokens, can be difficult in an image texture. According to a further feature of the present invention, a texton histogram operator provides a mechanism for capturing statistically uniform spatial variations of textured regions in a manner that is useful in a constraint based optimization, for example, as expressed by the [A][x]=[b] matrix equation.

Thus, according to this feature of the present invention, rather than generating Type C tokens in textured regions of an image, from intensity histograms, for use in identifying Type B tokens, as described above, texture tokens are generated as a species of Type B tokens, for use in a constraint. In an exemplary embodiment of the texton histogram operator, the operators block 28 converts each pixel of the image (or pixels of those regions of an image identified as comprising a texture) from the recorded color band representation of the respective image file 18, such as, for example, RGB color band values, to a two band representation wherein the two bands comprise a texton label and a texton histogram label. The two band representations for the pixels are then used to identify texture tokens, as will appear.

A texton label for each pixel is generated through execution of a clustering process. A texture can be characterized by a texture primitive (for example, in a grass texture, a single blade of grass), and the spatial distribution of the primitive. A texton analysis is an analytical method for characterizing a texture primitive, for example via a clustering algorithm. Clustering is a process for locating centers of natural groups or clusters in data. In an exemplary embodiment of the present invention, the data comprises pixel patches selected from among the pixels of an image being segregated into material and illumination components. For example, 3×3 pixel patches are clustered into K different groups, with each group being assigned a designating number (1, 2, 3, . . . K). The texton label for each pixel of the 3×3 array is the group number of the group to which the respective patch was assigned during the clustering process.

To expedite execution of a clustering algorithm, random samples of 3×3 patches can be selected throughout the image, or region of the image identified as comprising a texture, for processing in a clustering algorithm. After execution of the clustering algorithm by the CPU 12 (operating as the operators block 28), each 3×3 patch of the image is assigned the texton label of the closest one of the K group centers identified in the clustering process, as executed in respect of the selected random samples.

To advantage, prior to execution of a clustering algorithm, the pixels of the image are subject to an image intensity normalization. In a clustering process utilizing an intensity-based distance matrix, dark areas of an image may be placed in a single group, resulting in an under representation of groups for shadowed areas of a textured region of an image. A normalization of the image provides a more accurate texton representation for texture regions under varying illumination. A normalized intensity for a pixel can be expressed by:

$$i_{norm}(n,m)=\log(i(n,m)/i_b(n,m)),$$

where $i_{norm}(n,m)$ is the normalized intensity for a pixel p(n, m), i(n,m) is the intensity for the pixel p(n,m), as recorded in the image file 18, and $i_b(n,m)$ is a blurred or low passed filtered version of the pixel p(n,m). For example, a 10 pixel blur radius can be used in any standard blurring function.

Clustering can be executed according to any known clustering algorithm, such as, for example, K means clustering where there are K clusters or groups $S_i$, $i=1, 2, \ldots K$, and $\mu_i$ is the mean point or center point of all the data points $x_j \epsilon S_i$. In our example, each $x_j$ comprises a selected 3×3 pixel patch arranged as a 9×1 vector of the nine pixels in the patch (27 elements total, including the RGB values of each of the nine pixels of the vector). As noted above, each mean point $\mu_i$ is assigned a texton label, 1, 2, 3 . . . K, that becomes the texton label for any pixel of a 3×3 patch clustered into the group for which the respective mean point is the center.

According to an exemplary embodiment of the present invention, the CPU 12 executes the algorithm by initially partitioning the selected 9×1 vectors, representing 3×3 pixel patches of the image, into K initial groups $S_i$. The CPU 12 then calculates a center point $\mu_i$, for each group $S_i$ utilizing an intensity-based distance matrix. After determining a center point $\mu_i$, for each group $S_i$, the CPU 12 associates each 9×1 vector to the closest center point $\mu_i$, changing groups if necessary. Then the CPU 12 recalculates the center points $\mu_i$. The CPU 12 executes iterations of the steps of associating each 9×1 vector to the closest center point μ$_i$, and recalculating the center points μ$_i$, until convergence. Convergence is when there is no need to change the group for any of the 9×1 vectors. At that point, the CPU 12 assigns the group number for the respective center point μ$_i$, as the texton label for the pixels of each vector in that group.

As noted above, pixels of 3×3 patches not selected as samples for clustering are assigned the texton label of the closest one of the K group centers μ$_i$, identified in the clustering process, as executed in respect of the selected random samples. A texton label map is stored by the service provider 24, and is coextensive with the pixel array of FIG. 2. In the texton label map, for each pixel location, there is an indication of the respective texton label.

Upon completion of the texton label assignment for pixels of the image, the CPU 12 operates to generate a texton histogram for each pixel to provide a representation of the spatial variation of texton representations within a textured region of the image. To that end, the CPU 12 accesses the texton label map. At each pixel location within the texton label map, a pixel patch of, for example, 21×21 pixels, is set up around the current location. The 21×21 patch size is far greater than the 3×3 patch sized used to generate the texton representations, so as to capture the spatial variations of the texture. A texton histogram is then generated for the pixel location at the center of the 21×21 patch, in a similar manner as the intensity histogram described above. However, rather than bins based upon color band values, in the texton histogram, there is a bin for each texton label value, 1, 2, 3 . . . K. The count for each bin corresponds to the number of pixels in the 21×21 patch having the texton label value for the respective bin.

When a texton histogram is generated for each pixel of the texton label map, the CPU 12 executes a second clustering step. In the second clustering step, the texton histograms are clustered using spectral clustering. Spectral clustering techniques use a spectrum of a similarity matrix of data of interest, (in our example, the texton histograms) to reduce the dimensionality for clustering in fewer dimensions. A similarity matrix for a given set of data points A can be defined as a matrix S where S$_{ij}$ represents a measure of the similarity between points i, j∈A. In our example, eigenvectors of the Laplacian are clustered using a mean shift. The distance metric is a chi-squared distance of the histograms.

A texton histogram label (1, 2 . . . ) is assigned to each cluster group defined by the clustering procedure. For each pixel of the texton label map, the texton histogram label for the cluster group corresponding to a texton histogram that is nearest the texton histogram for the respective pixel, is assigned to that pixel. Distance is defined as the chi-squared histogram distance. Upon completion of the assignment of a texton histogram label to each pixel, each pixel is now represented by a two band, texton label, texton histogram label representation.

According to a feature of the present invention, the two band, texton label, texton histogram label representations for pixels of an image file 18 can be utilized in a constraint for construction of an [A]$_i$[x]=[b]$_i$ constituent within the concatenated matrices, [A][x]=[b]. For example, it can be assumed that a region of an image wherein contiguous pixels within the region all have the same two band, texton label, texton histogram label representation, comprises a region of the same mean material of a texture depicted in the image. Such a region can be referred to as a texture token, a species of a Type B token. Thus, a constraint can be imposed that all Type C tokens within the same texture token are of the same mean material. In this constraint, the Type C tokens are the Type C tokens generated from the color band values of the constituent pixels by the Type C tokenization block 35.

While the above exemplary embodiment of the present invention has been described with a user selecting constraint generators and mathematical operations via a GUI, the image segregation processing can be done in other operating modes, such as automatically, with images, constraint generators and mathematical operations being automatically selected, for example, as a function of image parameters.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
   providing an image file depicting an image, in a computer memory;
   assembling a feature vector for the image file, the feature vector containing information regarding a likelihood that a selected pair of regions of the image file are of a same intrinsic characteristic;
   providing a classifier derived from a computer learning technique;
   computing a classification score for the selected pair of regions of the image file, as a function of the feature vector and the classifier;
   classifying the regions as being of the same intrinsic characteristic, as a function of the classification score;
   when a classification score indicates regions as being of the same intrinsic characteristic, defining a constraint between the regions based upon a spatio-spectral relationship defined by the same intrinsic characteristic; and
   performing an optimization operation as a function of the constraint to utilize the spatio-spectral relationship defined by the same intrinsic characteristic to generate an intrinsic image corresponding to the image, the intrinsic image comprising a representation of one of material or illumination, expressed as a separate, multi-band representation for the one of material or illumination, independent of the other of the material or illumination, wherein each band corresponds to a segment of the electro-magnetic spectrum, such that when the intrinsic image comprises an illumination image, the illumination image captures the intensity and color of light incident upon each point on the surfaces depicted in the image, and when the intrinsic image comprises a material image, the material image captures reflectance properties of surfaces depicted in the image, including the percentage of each wavelength of light a surface reflects, to segregate the image into an intrinsic component.

2. The method of claim 1 wherein the regions comprise adjacent Type C tokens.

3. The method of claim 1 wherein the same intrinsic characteristic comprises a same material.

4. The method of claim 1 wherein the step of providing a classifier derived from a computer learning technique is carried out by training the classifier using an image database including coded ground truth versions of images in the image database.

5. The method of claim 4 wherein the coded ground truth versions of the images comprise manually coded images to indicate the same intrinsic characteristic.

6. The method of claim 1 wherein the classifier comprises a classifier arranged to process regions of the image that are adjacent and a classifier arranged to process regions of the image that are non-adjacent.

7. A computer system which comprises:

a CPU; and a memory storing an image file containing an image;

the CPU arranged and configured to execute a routine to assemble a feature vector for the image file, the feature vector containing information regarding a likelihood that a selected pair of regions of the image file are of a same intrinsic characteristic, provide a classifier derived from a computer learning technique, compute a classification score for the selected pair of regions of the image file, as a function of the feature vector and the classifier and classify the regions as being of the same intrinsic characteristic, as a function of the classification score, and wherein operation of the CPU, when a classification score indicates regions as being of the same intrinsic characteristic, includes operation to define a constraint between the regions based upon a spatio-spectral relationship defined by the same intrinsic characteristic, and perform an optimization operation as a function of the constraint to utilize the spatio-spectral relationship defined by the same intrinsic characteristic to generate an intrinsic image corresponding to the image, the intrinsic image comprising a representation of one of material or illumination, expressed as a separate, multi-band representation for the one of material or illumination, independent of the other of the material or illumination, wherein each band corresponds to a segment of the electro-magnetic spectrum, such that when the intrinsic image comprises an illumination image, the illumination image captures the intensity and color of light incident upon each point on the surfaces depicted in the image, and when the intrinsic image comprises a material image, the material image captures reflectance properties of surfaces depicted in the image, including the percentage of each wavelength of light a surface reflects, to segregate the image into an intrinsic component.

8. A computer program product, disposed on a non-transitory computer readable media, the product including computer executable process steps operable to control a computer to: assemble a feature vector for an image file, the feature vector containing information regarding a likelihood that a selected pair of regions of the image file are of a same intrinsic characteristic, provide a classifier derived from a computer learning technique, compute a classification score for the selected pair of regions of the image file, as a function of the feature vector and the classifier and classify the regions as being of the same intrinsic characteristic, as a function of the classification score, and wherein, when a classification score indicates regions as being of the same intrinsic characteristic, the product includes the further process steps to control a computer to define a constraint between the regions based upon a spatio-spectral relationship defined by the same intrinsic characteristic and to perform an optimization operation as a function of the constraint to utilize the spatio-spectral relationship defined by the same intrinsic characteristic to generate an intrinsic image corresponding to the image, the intrinsic image comprising a representation of one of material or illumination, expressed as a separate, multi-band representation for the one of material or illumination, independent of the other of the material or illumination, wherein each band corresponds to a segment of the electro-magnetic spectrum, such that when the intrinsic image comprises an illumination image, the illumination image captures the intensity and color of light incident upon each point on the surfaces depicted in the image, and when the intrinsic image comprises a material image, the material image captures reflectance properties of surfaces depicted in the image, including the percentage of each wavelength of light a surface reflects, to segregate the image into an intrinsic component.

9. The computer program product of claim 8 wherein the regions comprise adjacent Type C tokens.

10. The computer program product of claim 8 wherein the same intrinsic characteristic comprises a same material.

11. The computer program product of claim 8 wherein the process step to control the computer to provide a classifier derived from a computer learning technique is carried out by providing a process step to control the computer to train the classifier using an image database including coded ground truth versions of images in the image database.

12. The computer program product of claim 11 wherein the coded ground truth versions of the images comprise manually coded images to indicate the same intrinsic characteristic.

13. The computer program product of claim 8 wherein the classifier comprises a classifier arranged to process regions of the image that are adjacent and a classifier arranged to process regions of the image that are non-adjacent.

* * * * *